US012015233B2

(12) United States Patent
Glockseisen et al.

(10) Patent No.: US 12,015,233 B2
(45) Date of Patent: Jun. 18, 2024

(54) HAND PLIERS TOOL AND METHOD FOR ASSEMBLING THE SAME

(71) Applicant: WEZAG GmbH Werkzeugfabrik, Stadtallendorf (DE)

(72) Inventors: Thomas Glockseisen, Düsseldorf (DE); Gunthard Gebhard, Amoeneburg (DE)

(73) Assignee: WEZAG GmbH & Co. KG, Stadtallendorf (DE)

( * ) Notice: Subject to any disclaimer, the term of this patent is extended or adjusted under 35 U.S.C. 154(b) by 743 days.

(21) Appl. No.: 17/116,250

(22) Filed: Dec. 9, 2020

(65) Prior Publication Data

US 2021/0184412 A1 Jun. 17, 2021

(30) Foreign Application Priority Data

Dec. 11, 2019 (EP) .................................... 19215201

(51) Int. Cl.
*H01R 43/042* (2006.01)
*B25B 7/22* (2006.01)

(52) U.S. Cl.
CPC ........... *H01R 43/0421* (2013.01); *B25B 7/22* (2013.01)

(58) Field of Classification Search
CPC .............................. H01R 43/0421; B25B 7/22
USPC ............................................................ 81/346
See application file for complete search history.

(56) References Cited

U.S. PATENT DOCUMENTS 2,420,020 A * 5/1947 Snell ...................... B25B 7/123 269/221
4,794,780 A 1/1989 Battenfeld
5,153,984 A 10/1992 Beetz
5,187,968 A 2/1993 Beetz
5,509,291 A * 4/1996 Nilsson ............... H01R 43/042 72/409.14
5,526,570 A 6/1996 Beetz
5,913,933 A 6/1999 Beetz
6,026,671 A 2/2000 Battenfeld
6,053,025 A 4/2000 Beetz
6,155,095 A 12/2000 Beetz
6,286,358 B1 9/2001 Beetz
6,289,712 B1 9/2001 Beetz
6,474,130 B2 11/2002 Battenfeld
(Continued)

FOREIGN PATENT DOCUMENTS

CN 206316955 U 7/2017
DE 37 08 727 C2 7/1988
(Continued)

OTHER PUBLICATIONS

Product catalogue "Werkzeuge für die professionelle Anwendung" (publication No. 10/11) of the WEZAG GmbH Werkzeugfabrik company.

(Continued)

*Primary Examiner* — Hadi Shakeri
(74) *Attorney, Agent, or Firm* — The Sladkus Law Group

(57) ABSTRACT

The invention relates to a hand pliers tool which might be embodied as crimping pliers, tube pressing pliers or cutting pliers. According to the invention, pliers pivoting parts are not (exclusively) connected to each other for being pivoted by bearing bolts arranged in bearing bores. Instead, pivot bearings are formed by bearing lugs having edge openings by which it is possible to insert a bearing pin into the bearing lug.

9 Claims, 15 Drawing Sheets

(56) References Cited

U.S. PATENT DOCUMENTS

| | | | | |
|---|---|---|---|---|
| 6,612,147 | B2 | 9/2003 | Beetz | |
| 6,877,228 | B2 | 4/2005 | Beetz | |
| 6,910,363 | B2 | 6/2005 | Beetz | |
| 7,155,954 | B2 | 1/2007 | Battenfeld | |
| 8,113,031 | B2 | 2/2012 | Battenfeld | |
| 8,122,792 | B2 * | 2/2012 | Engvall | B25B 7/10 81/394 |
| 8,127,589 | B2 | 3/2012 | Battenfeld | |
| 8,230,715 | B2 | 7/2012 | Battenfeld | |
| 8,245,560 | B2 | 8/2012 | Battenfeld | |
| 8,296,956 | B2 | 10/2012 | Battenfeld | |
| 8,516,872 | B2 | 8/2013 | Battenfeld | |
| 8,601,856 | B2 | 12/2013 | Battenfeld | |
| 9,853,904 | B2 | 2/2017 | Battenfeld | |
| 9,634,451 | B2 | 4/2017 | Battenfeld | |
| 2003/0164073 | A1 * | 9/2003 | Chen | B25B 7/12 81/342 |
| 2014/0047885 | A1 | 2/2014 | Battenfeld | |
| 2017/0239788 | A1 * | 8/2017 | Battenfeld | B25B 7/22 |
| 2019/0363502 | A1 | 11/2019 | Glockseisen | |

FOREIGN PATENT DOCUMENTS

| | | | |
|---|---|---|---|
| DE | 40 23 337 | C1 | 10/1991 |
| DE | 40 39 435 | C1 | 6/1992 |
| DE | 40 26 332 | C2 | 7/1992 |
| DE | 42 41 224 | C1 | 1/1994 |
| DE | 43 03 180 | C1 | 1/1994 |
| DE | 44 27 553 | C2 | 6/1998 |
| DE | 298 03 336 | U1 | 7/1998 |
| DE | 197 09 639 | A1 | 9/1998 |
| DE | 198 02 287 | C1 | 12/1998 |
| DE | 197 13 580 | C2 | 12/1999 |
| DE | 198 32 884 | C1 | 12/1999 |
| DE | 198 07 737 | C2 | 6/2000 |
| DE | 198 34 859 | C2 | 2/2001 |
| DE | 199 63 097 | C1 | 4/2001 |
| DE | 199 24 087 | C2 | 6/2002 |
| DE | 100 56 900 | C1 | 8/2002 |
| DE | 199 24 086 | C2 | 8/2002 |
| DE | 197 53 436 | C2 | 10/2002 |
| DE | 101 32 413 | C2 | 7/2003 |
| DE | 102 42 345 | B3 | 2/2004 |
| DE | 103 46 241 | B3 | 8/2004 |
| DE | 101 40 270 | B4 | 9/2004 |
| DE | 10 2005 003 617 | B3 | 6/2006 |
| DE | 10 2005 003 615 | B3 | 9/2006 |
| DE | 20 2008 003 703 | U1 | 5/2008 |
| DE | 10 2007 038 626 | B3 | 10/2008 |
| DE | 10 2008 005 472 | B3 | 2/2009 |
| DE | 10 2008 003 524 | B4 | 12/2009 |
| DE | 10 2008 012 011 | B3 | 12/2009 |
| DE | 10 2007 001 235 | B4 | 6/2010 |
| DE | 10 2010 061 148 | A1 | 6/2012 |
| DE | 10 2011 052 967 | B4 | 12/2013 |
| EP | 0 471 977 | B1 | 6/1995 |
| EP | 1 724 101 | A1 | 11/2006 |
| EP | 1 724 101 | B1 | 2/2011 |
| EP | 2 305 428 | A1 | 4/2011 |
| EP | 2 463 969 | A2 | 6/2012 |
| EP | 2 672 580 | A1 | 12/2013 |
| EP | 2 672 580 | B1 | 12/2013 |
| EP | 2 698 885 | A1 | 2/2014 |
| EP | 2 826 598 | A1 | 1/2015 |
| EP | 2 562 891 | B1 | 3/2016 |
| EP | 2 995 424 | A1 | 3/2016 |
| EP | 3 012 923 | A1 | 4/2016 |
| EP | 3 012 924 | A1 | 4/2016 |
| EP | 2 826 598 | B1 | 12/2016 |
| EP | 3 159 107 | A1 | 4/2017 |
| EP | 3 208 044 | A1 | 8/2017 |
| EP | 2 995 424 | B1 | 12/2018 |
| EP | B 159 088 | B1 | 12/2018 |
| EP | 3 572 188 | A1 | 11/2019 |
| EP | 3 159 107 | B1 | 5/2020 |
| EP | 3 656 504 | A1 | 5/2020 |
| TW | 379630 | U | 1/2000 |

OTHER PUBLICATIONS

Publication "Crimptechnik, Herstellung prozesssicherer Verbindungen von elektrischen Leitern und Steckern" of the WEZAG GmbH Werkzeugfabrik company, Die Bibliothek der Technik 342, Verlag Moderne Industrie, ISBN 978-3-68236-027-7.

* cited by examiner

HAND PLIERS TOOL AND METHOD FOR ASSEMBLING THE SAME

CROSS REFERENCE TO RELATED APPLICATIONS

This application claims priority to co-pending European Patent Application No. EP 19 215 201.5 filed Dec. 11, 2019.

FIELD OF THE INVENTION

The invention relates to a hand pliers tool (so a pliers tool actuated manually) which is in particular embodied as pressing pliers, crimping pliers or cutting pliers. Furthermore, the invention relates to a method for assembling a hand pliers tool.

BACKGROUND OF THE INVENTION

Inventive pressing pliers can e.g. serve for manually pressing a tube, mounting or casing or fitting. Pressing pliers of this type are e.g. described in the publications DE 197 09 639 A1, DE 198 34 859 C2, DE 199 24 086 C2 (corresponding to U.S. Pat. No. 6,286,358 B1), DE 199 24 087 C2 (corresponding to U.S. Pat. No. 6,289,712 B1), DE 199 63 097 C1 (corresponding to U.S. Pat. No. 6,474,130 B2), DE 103 46 241 B3 (corresponding to U.S. Pat. No. 7,155,954 B2), DE 10 2007 001 235 B4 (corresponding to U.S. Pat. No. 8,127,589 B2), DE 10 2008 005 472 B3 (corresponding to U.S. Pat. No. 8,245,560 B2), EP 2 995 424 A1 (corresponding to EP 2 995 424 B1) and EP 2 826 598 A1 (corresponding to EP 2 826 598 B1) or EP 3 208 044 A1 (corresponding to US 2017/0239788 A1).

By means of inventive crimping pliers it is possible to induce a pressing or crimping of a workpiece by a manual actuation of hand levers. Here, the crimping pliers in particular serve for producing a durable mechanical connection and providing an electrical contact. This is preferably achieved by crimping a connector or plug to a cable or an electrical conductor of any type. Dependent on the profile of the dies used it is possible to perform different crimping processes with the crimping pliers. It is e.g. possible to produce a closed crimp by introducing the electric conductor into a closed crimping zone of a connector or plug or into a closed sleeve and by crimping the crimping zone or sleeve with a plastic deformation. However, it is also possible to produce an open crimp wherein the connector or plug comprises an open crimping zone into which it is possible to insert the electric conductor from above. To mention only some examples not limiting the invention, with the crimping pliers

- cable shoes or terminals according to German standard DIN 4623,
- aluminum connectors according to German standard DIN 46329,
- aluminum press-fit terminals according to German standard DIN 48201,
- crimp terminals or squeezing cable shoes according to German standard DIN 46234,
- pin terminals or pin cable shoes according to German standard DIN 46230 or
- connectors, plugs or terminals for a connection to a cable or conductor as described in the product catalog “Werkzeuge für die professionelle Anwendung” of WEZAG GmbH Werkzeugfabrik (publication no. 10/11)

can be crimped.

For a closed crimp the produced crimp may be a hexagonal crimp, a square crimp, a B crimp, a trapezoidal crimp, a modified trapezoidal crimp, an oval crimp, a mandrel crimp or a double mandrel crimp. An open crimp may e.g. be realized as a V crimp or B crimp, a rolled crimp or a double rolled crimp.

In addition to establishing the electric connection between cable and conductor and plug, a mechanical connection may be established by means of a so-called insolation crimp. Here, a closed insolation crimp or an open insolation crimp (especially a V crimp or B crimp, O crimp or OV crimp) may be employed. With regard to further information

- on a design of generic crimping pliers,
- on possible applications of generic crimping pliers and/or
- on different possible types of crimp connections which can be produced with the generic crimping pliers reference is made to the document “Crimptechnik, Herstellung prozesssicherer Verbindungen von elektrischen Leitern und Steckern” of WEZAG GmbH Werkzeugfabrik (Die Bibliothek der Technik 342, Verlag Moderne Industrie, ISBN 978-3-68236-027-7).

Crimping pliers of the present type are e.g. described in the publications EP 3 208 044 A1 (corresponding to US 2017/0239788 A1), EP 3 012 924 A1 (corresponding to U.S. Pat. No. 9,583,904 B2), EP 3 012 923 A1 (corresponding to U.S. Pat. No. 9,634,451 B2), EP 2 698 885 A1 (corresponding to US 2014/0047885 A1), EP 2 672 580 A1, EP 2 463 969 A2 (corresponding to U.S. Pat. No. 8,601,856 B2), DE 37 08 727 C2 (corresponding to U.S. Pat. No. 4,794,780 A), DE 40 23 337 C1 (corresponding to U.S. Pat. No. 5,153,984 A), DE 40 26 332 C2, DE 40 39 435 C1 (corresponding to U.S. Pat. No. 5,187,968 A), DE 42 41 224 C1, DE 44 27 553 C2, DE 197 13 580 C2 (corresponding to U.S. Pat. No. 5,913,933 A), DE 197 53 436 C2, DE 198 02 287 C1 (corresponding to U.S. Pat. No. 6,053,025 A), DE 198 07 737 C2 (corresponding to U.S. Pat. No. 6,026,671 A), DE 298 03 336 U1, DE 198 32 884 C1 (corresponding to U.S. Pat. No. 6,155,095 A), DE 100 56 900 C1 (corresponding to U.S. Pat. No. 6,612,147 B2), DE 101 32 413 C2 (corresponding to U.S. Pat. No. 6,877,228 B2), DE 101 40 270 B4, DE 102 42 345 B3 (corresponding to U.S. Pat. No. 6,910, 363 B2), DE 10 2005 003 615 B3, DE 10 2005 003 617 B3, DE 10 2007 038 626 B3 (corresponding to U.S. Pat. No. 8,296,956 B2), DE 10 2008 003 524 B4 (corresponding to U.S. Pat. No. 8,113,031 B2), DE 10 2008 012 011 B3 (corresponding to U.S. Pat. No. 8,230,715 B2), DE 20 2008 003 703 U1, EP 1 724 101 A1, EP 2 305 428 A1 (corresponding to U.S. Pat. No. 8,516,872 B2), DE 10 2010 061 148 A1 (corresponding to U.S. Pat. No. 8,601,856 B2), DE 10 2011 052 967 B4 or can be embodied as manual crimping tools distributed by the applicant prior to the application date of the present patent application under the labels CS10, CSV10, CSV10-LWL, CSV10-FFC, AE, CS8, CK100, CS30, CS KTVR, CE/CG, CS150, CS200, CS210, CP600.

A cutting tool of the inventive type might e.g. be embodied as manually actuated cable cutting pliers, can be embodied as disclosed in the publications DE 43 03 180 C1 (corresponding to U.S. Pat. No. 5,526,570 A), EP 3 159 088 B1 or EP 3 159 107 A1 (corresponding to EP 3 159 107 B1) or can be embodied as a cutting tool distributed by the applicant prior to the application date of the present patent application under the label cable cutter SH.

In the last years, hand pliers tools have more and more been equipped with electronic constructional units for providing additional functions (as e.g. a monitoring of a pliers force or crimping force and/or of a working stroke of the pliers jaws or an evaluation of the execution of the working process with the hand pliers tool). Options for additional functions of this type and for the design of the electronic constructional unit are disclosed in the publication EP 3 572 188 A1 (corresponding to US 2019/0363502 A1). Here, a mechanical pliers part used for providing the force transmission is equipped with an electronic constructional unit mounted to a region of the pliers head. In this publication the electronic constructional unit is also denoted as Tech-Pack.

The European patent application EP 3 656 504 (corresponding to US 2020/0161822 A1) discloses crimping pliers comprising an electronic capturing device by which it is possible to automatically identify a die inserted into a pliers jaw. Furthermore, the patent application discloses the integration of the crimping pliers into a network. Here, the network (besides the crimping pliers) comprises a central computer or smartphone communicating with the crimping pliers. The central computer or the smartphone again communicates with a cloud-storage unit. The network is used for a documentation of the crimping process, in particular of an input or captured workpiece, of the automatically identified die, of the crimping force and/or of the crimping displacement and/or the network is used for an analysis if a workpiece which is automatically captured or input by the user can be crimped with the automatically captured die.

DE 10 2005 022 188 A1 discloses a bolt cutter wherein two cutting jaws are each supported for being pivoted by a screwing bolt on a connecting tab. The distance of the screwing bolts here defines the distance of the pivot axes of the cutting jaws of the bolt cutter. On the side of the connecting tabs facing away from the cutting edges of the cutting jaws hand levers are linked to a toggle joint which is effective between the two hand levers for establishing a toggle lever drive such that by a pivoting movement of the hand levers it is possible to induce an opening and closing movement of the cutting jaws. Close to the inner ends of the cutting edges a convex protrusion is formed by the first cutting jaw. The second cutting jaw comprises a concave recess. With the closing movement of the cutting jaws the convex protrusion of the first cutting jaws rolls along the concave recess of the second cutting jaw. Here, the contact point between the protrusion and the recess changes in longitudinal direction of the bolt cutter. DE 10 2005 022 188 A1 also proposes that the convex protrusion might comprise an outer toothing which then meshes with an inner toothing of the convex recess.

Pliers with corresponding meshing toothings (however, here of the hand levers) are disclosed in US 2011/0214538 A1.

The publication DE 28 54 633 A1 (corresponding to U.S. Pat. No. 4,158,302 A; forming the closest prior art for the present invention) discloses scissor-like pliers wherein the two scissors parts each integrally form a hand lever and a pliers jaw. The two scissors parts are connected to each other by a scissors joint. The scissors joint comprises a pivot bolt which extends through bearing lugs of the two scissors parts having closed edges. A forced locking unit is effective between the two scissors parts. The forced locking unit has a design and is linked to the two hand levers of the scissors parts in a way such that the forced locking unit is able to secure a partially closed position once induced. In order to be able to adjust the operational region of the force locking unit and to adjust the closed position secured by the forced locking unit an adjusting device is suggested. By the adjusting device it is possible to link the forced locking unit at different positions of one hand lever. For one embodiment of the adjusting device the hand lever comprises slits which are inclined relatedly to the longitudinal extension of the handle in forward direction. It is possible to insert a pin carried by the end region of the force locking unit into the respective slits for the different adjustment positions.

SUMMARY OF THE INVENTION

The invention relates to a hand pliers tool which comprises hand levers and pliers jaws. The hand levers and the pliers jaws are coupled to each other by a drive mechanism in a way such that it is possible to induce a movement of the pliers jaws over a working stroke by a movement of the hand levers. Preferably, a suitable transmission ratio of the forces applied by the hand of the user on the hand levers is provided by means of the drive mechanism. To mention only one non-limiting example, the drive mechanism might comprise a toggle lever drive.

The inventive drive mechanism comprises drive elements which for the above example of a toggle lever drive might be the toggle levers.

In the inventive hand pliers tool two pliers pivoting parts (which might be embodied as a hand lever, a pliers jaw and/or a drive element) are connected to each other for being pivoted by a pivot bearing. The pivoting of the pliers pivoting parts during the working stroke of the hand pliers tool is a pivoting about a pivot axis defined by the pivot bearing. Accordingly, a pivoting of the pliers pivoting parts about the pivot axis of the pivot bearing correlates to a pivoting of the pliers jaws and the hand levers relative to each other corresponding to kinematics defined by the drive mechanism.

For the embodiments known from the prior art usually a pivot bearing between the two pliers pivoting parts is provided by a pivot bolt which extends through aligned bearing bores of the pliers pivoting parts and which is secured in axial direction by a shoulder of the pivot bolt, securing rings, a snap ring and the like. However, this design leads to the consequence that for the formation of the pivot bearing the pivoting bolt and at least one additional securing element is required (additional to the pliers pivoting parts that have to be connected and additional to the bores of the pliers pivoting parts) which increases the number of components. Furthermore, for an assembly of the pivot bearing in the beginning the two pliers pivoting parts have to be aligned exactly relative to each other so that the bearing bores of the pliers pivoting parts are aligned to each other. Subsequently, it is required to insert the bearing bolt into the aligned bearing bores and additional securing measures have to be taken which increases the complexity of the assembly.

The invention proposes a different way for the formation of the pivot bearing: According to the invention, a first pliers pivoting part comprises a bearing lug. However, this bearing lug does not have a closed edge as being the case for a bearing bore. Instead, the bearing lug comprises an edge opening which means that the bearing lug does not have a cross-section with a continuously closed inner contour but an inner contour being open due to the edge opening. The second pliers pivoting part comprises a bearing pin. This bearing pin can be inserted via the edge opening into the bearing lug. In this state of the bearing pin inserted into the bearing lug, the bearing lug is supported for being pivoted in the bearing lug so that the pivot bearing is formed. According to the invention, an insertion of an additional pivot bolt into a bearing lug of the first pliers pivoting part can be dispensable and/or in some cases there is no need for the use and the assembly of at least one additional securing element.

For a first proposal of the invention the bearing pin of the second pliers pivoting part comprises an outer surface having two different outer surface portions: In a first outer surface portion the transverse extension is larger than the transverse extension of the edge opening. Instead, in the second outer surface portion the transverse extension is smaller than the transverse extension of the edge opening. This leads to the consequence that when orienting the bearing pin in a way such that the transverse extension of the first outer surface portion has an orientation as the transverse extension of the edge opening of the first pliers pivoting part an entry of the bearing pin into the edge opening of the bearing lug of the first pliers pivoting part is not possible and it is also not possible that the bearing pin exits from the bearing lug from the edge opening. If instead the second outer surface portion has an orientation such that its transverse extension is parallel to the transverse extension of the edge opening the bearing pin is able to enter through the edge opening into the bearing lug and also a disassembly through the edge opening is possible. If e.g. the bearing pin is generally cylindrical and the cylindrical outer surface has a flattening, the bearing pin can be assembled or disassembled to or from the bearing lug with the edge opening if the bearing pin has an orientation such that the transverse extension is reduced due to the flattening. Preferably, for avoiding an undesired release of the connection between the bearing pin and the bearing lug with the edge opening, the completely assembled hand pliers tool over the whole working stroke of the hand pliers tool never results in an orientation of the bearing pin relative to the bearing lug such that the transverse extension of the second outer surface portion corresponds to the transverse extension of the edge opening of the first pliers pivoting part.

The invention covers embodiments wherein the pivot bearing is exclusively formed between one single bearing pin and the bearing lug comprising the edge opening. It is also possible that (e.g. on both sides of a base body of the pliers pivoting part) each a respective bearing pin is formed. In this case, the two bearing pins are each accommodated in an associated bearing lug of the other pliers pivoting part having an open edge. In this way, it is possible to increase the supporting surface and to improve the guidance of the pliers pivoting parts and it is possible to provide a symmetric support of the base body on both sides.

For a second proposal of the invention, the first pliers pivoting part comprises the bearing lug having the edge opening. Additionally, the first pliers pivoting part comprises another bearing lug having a closed edge. The two bearing lugs are aligned to each other. The second pliers pivoting part comprises the bearing pin described above and another bearing pin. In this case, a base body of the second pliers pivoting part is arranged between the bearing pin and the other bearing pin. Here, the two bearing pins are aligned to each other and have the same orientation. For this design, one bearing pin is arranged in the bearing lug having the edge opening, whereas the other bearing pin is arranged in the bearing lug having the closed edge. In this way, it is possible to improve the rigidity of the formed pivot bearing and the guidance provided by the pivot bearing. Here, the bearing surfaces of the bearing lug having the closed edge might have an increased mechanical stiffness and an increased resistance which is due to the fact that the material of the pliers pivoting part completely extends in circumferential direction of the bearing lug. Furthermore, the bearing lug having the closed edge guarantees that the associated bearing pin is not able to exit from the bearing lug in any direction in the pivoting plane. Instead, this bearing pin can only be inserted into an assembly direction along the pivot axis of the bearing lug into the bearing lug having the closed edge and exit in this direction from the bearing lug. The bearing lug comprising the edge opening provides an additional pivot bearing which might have a reduced functionality when compared to the first mentioned pivot bearing.

Within the frame of the invention there are a lot of options for the geometry of the first pivot bearing part and in particular for the geometry of the pivot bearing part in the region of the at least one bearing lug. The pliers pivoting part might comprise one or a plurality of plates or any form body. For the second proposal of the invention, the first pliers pivoting part might comprise (in the region of the bearing lugs formed by the same) two plates having an orientation parallel to each other and being spaced from each other. In a first plate, the bearing lug with the edge opening is formed, whereas in the other second plate another bearing lug (in some cases also comprising an edge opening or the previously mentioned bearing lug having a closed edge) is formed.

For a particular proposal of the invention, the first plate of the first pliers pivoting part comprises an insertion slit which opens into the edge opening of the bearing lug or only comprises an edge opening. For this proposal, the base body of the second pliers pivoting part comprises a portion which during the assembly is arranged in an assembling angular orientation in the region of the insertion slit and/or the edge opening. According to one embodiment of the invention, the aforementioned portion is smaller than the insertion slit and/or the edge opening. Furthermore, this portion of the base body of the second pliers pivoting part has a thickness which is smaller than the distance of the two plates. This design leads to the consequence that for an assembly wherein the pliers pivoting parts are brought into the assembling angular orientation and are moved towards each other in the direction of the pivot axis the bearing pin is able to enter into the bearing lug with the closed edge. At the same time, the aforementioned portion of the base body of the second pliers pivoting part is able to pass through the insertion slit and/or the edge opening and to arrive at an assembly position wherein the portion contacts the second plate. If then the relative angle of the pliers pivoting parts is changed about the pivot axis from the assembling angular position to an operating angular position the aforementioned portion is captured between the two plates in a direction corresponding to the orientation of the pivot axis. Here, preferably the assembling angular position is an angular position which is only achieved during the assembly, whereas this angular position cannot be reached when running through the working stroke.

The two plates can be formed by struts or even a one-pieced or integral body of any geometry.

The invention also covers embodiments wherein the pliers pivoting part comprises a base body and at least one bearing pin. Here, the base body in particular serves for the force transmission from or to the pivot bearing or a support in the drive mechanism. The bearing pin serves for the formation of the pivot bearing and so for the provision of the pivoting degree of freedom between the two pliers pivoting parts. Here, it is possible that the bearing pin forms a bearing bolt as a part separate from the base body. In this case, the bearing bolt is e.g. inserted with a press-fit into a bore of the base body or the bearing pin is connected in any other known fashion to the base body and secured on the same. However, the invention preferably proposes that the bearing pin is an integral part of the base body. In this way, it is possible to further reduce the number of the components and to reduce the assembly effort. In some cases, the integral design leads to an increased stiffness and it might be possible to at least reduce a play.

Preferably, in the region of the aforementioned plates the first pliers pivoting part has an U-shaped cross-section. In this case, the two side legs of the U each form one plate.

For inventive embodiments of the hand pliers tool, an exit of the bearing pin of the second pliers pivoting part from a bearing lug of the first pliers pivoting part having an edge opening might be provided by a kind of form lock as follows: It is possible that the bearing pin of the second pliers pivoting part can only be inserted in a specific angular position (which has above been denoted as assembly angular position) or in a specific angular region for the relative angle of the pliers pivoting parts into the edge opening of the bearing lug of the first pliers pivoting part. When the hand pliers tool has been completely assembled, due to the interaction of the further pliers pivoting parts it is not possible to arrive in this specific angular position or in this specific angular region. Accordingly, an exit of the bearing pin of the second pliers pivoting part through the edge opening of the bearing lug of the first pliers pivoting part is not possible for the completely assembled hand pliers tool. Instead, it is required to disassemble other pliers pivoting parts (which in some cases can be secured by specific securing devices) before it is possible to restore the specific angular position or the specific angular region and before disassembling the bearing pin of the pliers pivoting part through the edge opening from the bearing lug of the first pliers pivoting part.

For the choice of the hand pliers tool parts which can be connected to each other as described before there are a lot of different options within the frame of the invention. In order to mention only some examples (which are not intended to limit the invention), one of the two pliers pivoting parts might be a hand lever, whereas the other pliers pivoting part might be a pliers jaw. Alternatively or cumulatively, it is possible that the inventive connection is used for a connection of a hand lever to a pressure lever. Alternatively or cumulatively, it is also possible that the inventive connection forms a pivot bearing between a hand lever and a locking pawl of a forced locking unit. Here, a forced locking unit serves for securing an induced position after a sub-stroke of the working stroke against an undesired opening of the hand pliers tool also when temporarily removing the actuation force applied to the hand lever and additionally serves for providing that the working stroke is completely passed.

The pliers pivoting parts connected to each other by a pivot bearing formed according to the invention might have any function in the hand pliers tool and/or might have any geometry. Also the use of any material (in particular a metallic material as aluminum or steel) is possible. For another proposal of the invention, at least one pliers pivoting part is made of plastic which covers that the pliers pivoting part is completely made of plastic or a composite material comprising plastic is used or a fiber enforced plastic material is used (as e.g. a glass fiber enforced plastic, also abbreviated as GFK, cp. the contribution under "Glasfaserverstärkter Kunststoff" on the website Wikipedia of Nov. 19, 2019 concerning usable plastic materials and fiber materials, the length and orientations of fibers, the use of webs, rovings or uni-directional webs and the like).

At least one pliers pivoting part can be manufactured in an MIM-process. Under an MIM-process a metallic powder injection molding process is subsumed. With respect to the execution of the manufacturing process, usable materials and the requirements for the design of the geometry of the manufactured workpiece reference is made to the contribution "Metallpulverspritzguss" on the website Wikipedia with the date of inspection of Nov. 19, 2019.

Generally, the inventive hand pliers tool can serve for any purpose and can be adapted in its design for the intended use. Preferably, the inventive hand pliers tool is embodied as crimping pliers, cutting pliers or tube pressing pliers.

For one particular embodiment, the invention proposes that at the end of the assembly of the hand pliers tool two pivoting pliers parts are connected to each other for being pivoted by a pivot bearing. Here, a bearing bolt extends through bearing lugs of the two pliers pivoting parts having a closed edge. In this assembled position of the bearing bolt an axial securing of the same is provided by additional securing elements as shoulders or securing rings. However, it is also possible that no securing element is used if the bearing bolt is inserted or pressed with a press-fit into the bearing bore of a pliers pivoting part. Any other pliers pivoting parts are for this particular embodiment exclusively connected to each other by pivot bearings wherein bearing pins are accommodated in bearing lugs having an open edge.

Generally, it is possible that the bearing pin is able to exit from the bearing lug having the open edge. However, the exit can be made impossible by the assembly of the bearing bolt to the two bearing lugs of the two pliers pivoting parts having closed edges. This is due to the fact that by the assembly it is avoided that the other pliers pivoting parts arrive in a relative position wherein the bearing pin is able to exit from the edge openings of the bearing lugs. The assembly of a hand pliers tool of this type is notably simplified because in the beginning the different pliers pivoting parts only have to be inserted into each other with the entry of the bearing pins into the edge openings of the bearing lugs. The assembly is finalized and so a loss-proof connection of all of the pliers pivoting parts can be provided by the assembly of one single bearing bolt to the bearing lugs of the last remaining two pivoting pliers parts having the closed edges. The last remaining pliers pivoting parts (comprising the bearing lugs having closed edges and being connected to each other for being pivoted by the bearing bolt) might be the two pliers jaws or one fixed pliers part forming the pliers jaw and the other movable pliers jaw.

Another proposal of the invention aims for a (further) reduction of the number of components of the hand pliers tool and the required assembly steps. For one embodiment a mechanical pliers subassembly is provided. The pliers subassembly is defined such that the pliers subassembly contains all of the components which are required for transmitting the hand force applied by the user on the hand levers to the pliers jaws. Accordingly, the pliers subassembly in particular includes the hand levers and the pliers jaws as well as the drive elements of the drive mechanism interposed between the hand levers and the pliers jaws. Instead, further components (that do not serve for the transmission of the forces between the hand levers and the pliers jaws) are not part of the mechanical pliers subassembly. In this case, for one embodiment the invention proposes that the mechanical pliers subassembly comprises only one bearing bolt (and if applicable, any components required for securing the bearing bolt, which, however, can be dispensable when accommodating the bearing bolt by a press-fit) and a maximum of four further components. Here, the components are rigid components that can be made by one piece or a plurality of pieces. To mention only one example, which is not intended to limit the invention, the four further components might be a fixed pliers part which forms a fixed hand lever and a fixed pliers jaw,
a movable hand lever,
a movable pliers jaw and,
a pressure lever.

It is generally possible that the hand pliers tool comprises additional components which are not part of the mechanical pliers subassembly. It is e.g. possible that additional opening springs and closing springs, handle shells, constructional elements of a forced locking unit and the like are provided. It is also possible that additionally an electronic unit is provided (as being known from the European patent application EP 3 572 188 A1).

Another solution of the object of the invention is given by a method for assembling a hand pliers tool of the aforementioned type. For this method, in a first method step a first pivot bearing between a pressure lever and a fixed pliers part is assembled. The fixed pliers part here forms a fixed pliers jaw and a fixed hand lever. The assembly of the first pivot bearing is provided by an insertion of a bearing pin into a bearing lug having an open edge. Here, the bearing pin might be arranged at the pressure lever or at the fixed pliers part so that then the bearing lug having the open edge is arranged at the other component of the pressure lever and the fixed pliers part. Subsequently, a second pivot bearing is assembled, namely a pivot bearing between a movable hand lever and a movable pliers jaw. Also the assembly of the second pivot bearing is provided by an insertion of a bearing pin into a bearing lug having an open edge. Also here, the bearing pin might be provided on the movable hand lever or on the movable pliers jaw, whereas then the bearing lug is arranged on the other component of the movable hand lever and the movable pliers jaw. Subsequently, a third pivot bearing is assembled between the pressure lever and the movable hand lever which is provided by the insertion of a bearing pin into a bearing lug having an open edge. Also here, the bearing pin might be arranged on the pressure lever or the movable hand lever. In this case, the bearing lug is arranged on the other component of the pressure lever and the movable hand lever. Finally, a fourth pivot bearing is assembled between the movable pliers jaw and the fixed pliers part. This is provided by inserting a bearing bolt into bearing bores of the movable pliers jaw and the fixed pliers part each having a closed edge. Then, the bearing bolt is secured against an exit from the bearing bores. With the assembly of the fourth pivot bearing and the securing of the same also the first, second and third pivot bearing are secured against an undesired exit of the respective bearing pin from the respective bearing lug.

For one embodiment of the inventive method, a spring base of an opening spring of the hand pliers tool is connected to the fixed pliers part which is preferably done between the steps of the assembly of the first and second pivot bearing. Furthermore, in this method the other spring base of the opening spring is connected to the fixed pliers jaw, which is preferably done before, simultaneously or after the assembly of the third pivot bearing (but in some cases after the assembly of the second pivot bearing and before the assembly of the fourth pivot bearing).

For a different or an additional development of the inventive method (e.g. between the provision of the first and second pivot connection), a pivot bearing between a locking element of a forced locking unit and the movable hand lever is assembled by inserting a bearing protrusion of the locking element into a bearing lug of the movable hand lever having an open edge.

Advantageous developments of the invention result from the claims, the description and the drawings.

The advantages of features and of combinations of a plurality of features mentioned at the beginning of the description only serve as examples and may be used alternatively or cumulatively without the necessity of embodiments according to the invention having to obtain these advantages.

The following applies with respect to the disclosure—not the scope of protection—of the original application and the patent: Further features may be taken from the drawings, in particular from the illustrated designs and the dimensions of a plurality of components with respect to one another as well as from their relative arrangement and their operative connection. The combination of features of different embodiments of the invention or of features of different claims independent of the chosen references of the claims is also possible, and it is motivated herewith. This also relates to features which are illustrated in separate drawings, or which are mentioned when describing them. These features may also be combined with features of different claims. Furthermore, it is possible that further embodiments of the invention do not have the features mentioned in the claims which, however, does not apply to the independent claims of the granted patent.

The number of the features mentioned in the claims and in the description is to be understood to cover this exact number and a greater number than the mentioned number without having to explicitly use the adverb "at least". For example, if an element is mentioned, this is to be understood such that there is exactly one element or there are two elements or more elements. Additional features may be added to these features, or these features may be the only features of the respective product.

The reference signs contained in the claims are not limiting the extent of the matter protected by the claims. Their sole function is to make the claims easier to understand.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

In the figures partly components having the same or comparable functions are denoted with the same reference numbers. In this case, the components are partly distinguished from each other by the additional letters a, b, . . . In the description and in the patent claims partially reference is made to these components by use of the reference number without the additional letter. In this case, reference is made to one single component, a plurality of these components or all of these components.

Figure 1:
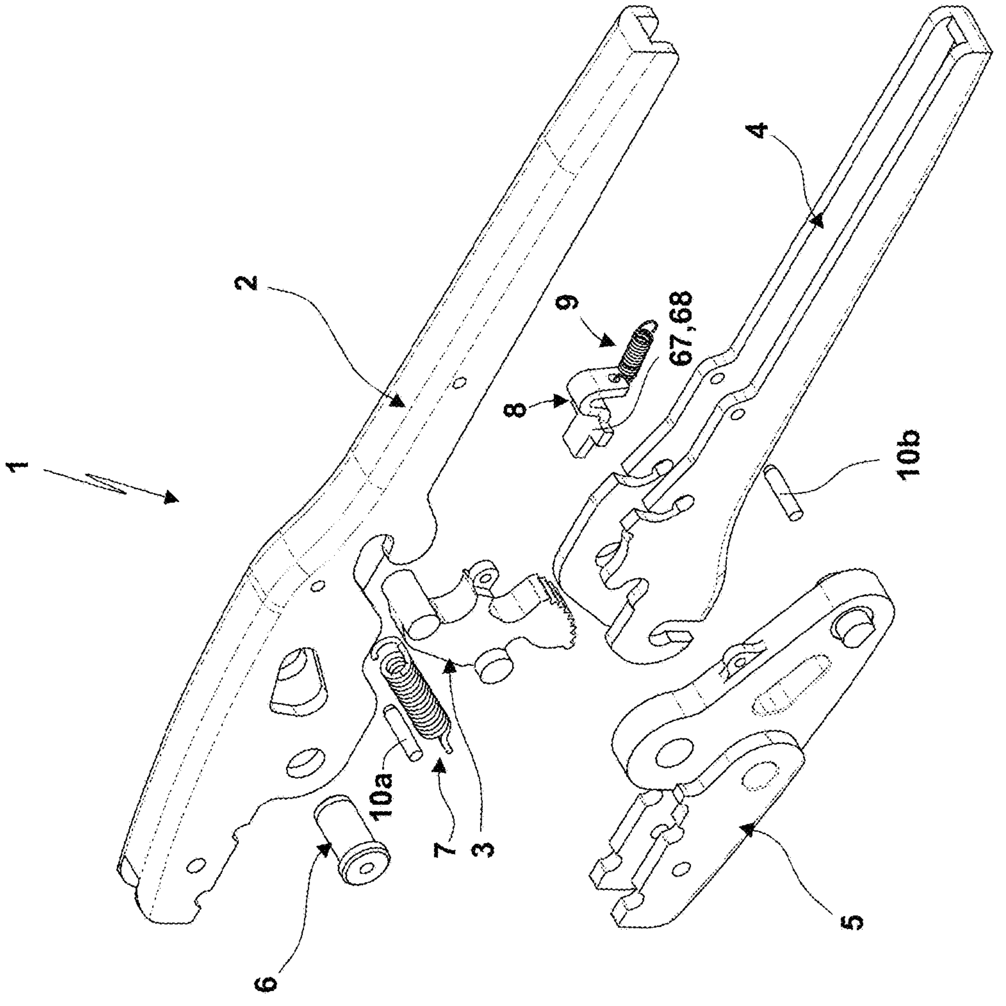
FIG. 1 in a three-dimensional exploded view shows components of a hand pliers tool.

FIG. 1 in a three-dimensional exploded view shows a hand pliers tool 1. A hand pliers tool is understood to be a tool which is manually actuated via hand levers and wherein pliers jaws interact with a workpiece for cutting, pressing or crimping. Here, the hand levers are preferably pivoted over the working stroke, whereas the pliers jaw can be pivoted relative to each other over the working stroke (as for the embodiments shown here) or can also be moved relative to each other by a translational relative movement (cp. in particular the crimping pliers with the label "CS10" or "CSV10" of the applicant). Generally, the hand pliers tool 1 might have any construction, cp. the different constructions according to the prior art mentioned in the beginning.

According to FIG. 1, the hand pliers tool 1 comprises a fixed pliers part 2, a pressure lever 3, a movable hand lever 4, a movable pliers jaw 5, a bearing bolt 6, an opening spring 7, a locking element 8 of a forced locking unit, a locking spring 9 of the forced locking unit and bolts 10*a*, 10*b*.

Figure 2:
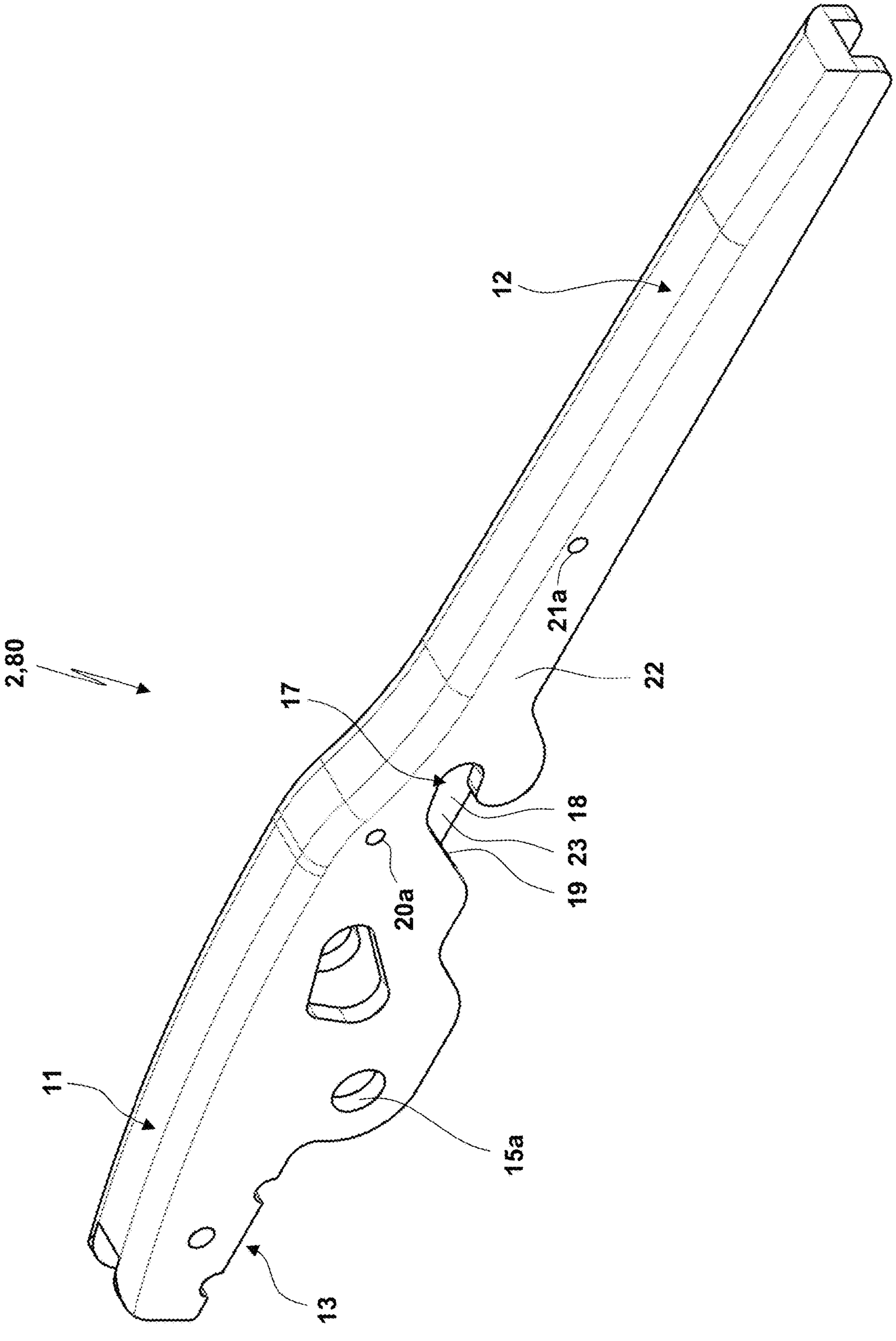
FIGS. 2 to 5 show components of the hand pliers tool of FIG. 1 in three-dimensional single part representations, namely a fixed pliers part (FIG. 2), a pressure lever (FIG. 3), a movable hand lever (FIG. 4) and a movable pliers jaw (FIG. 5).

FIG. 2 shows the fixed pliers part 2 in a three-dimensional single part representation. The fixed pliers part 2 forms a fixed pliers jaw 11 and a fixed hand lever 12 which are here integrally connected to each other as one piece.

Figure 14:
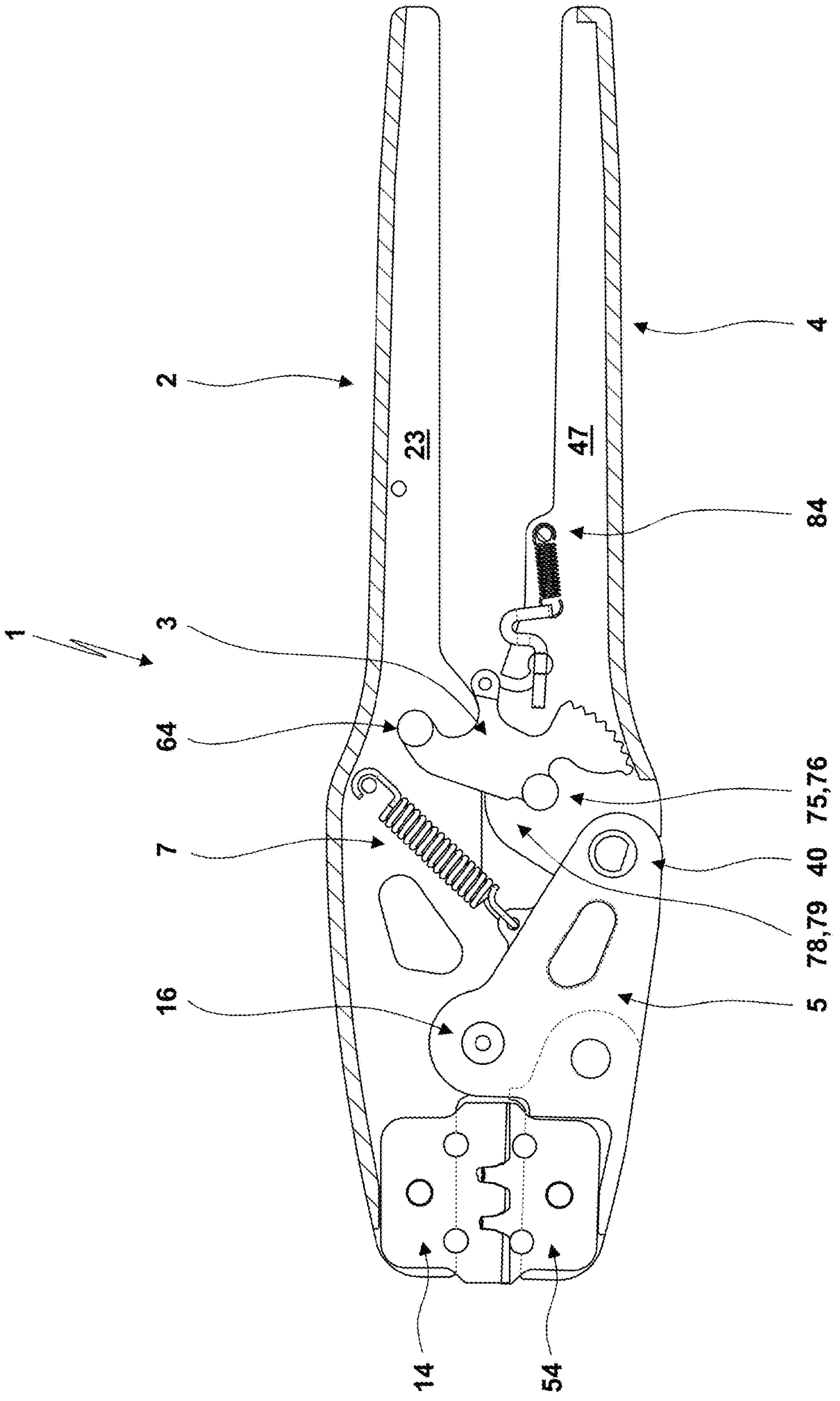
FIG. 14 in a longitudinal section shows the assembled hand pliers tool.
Figure 15:
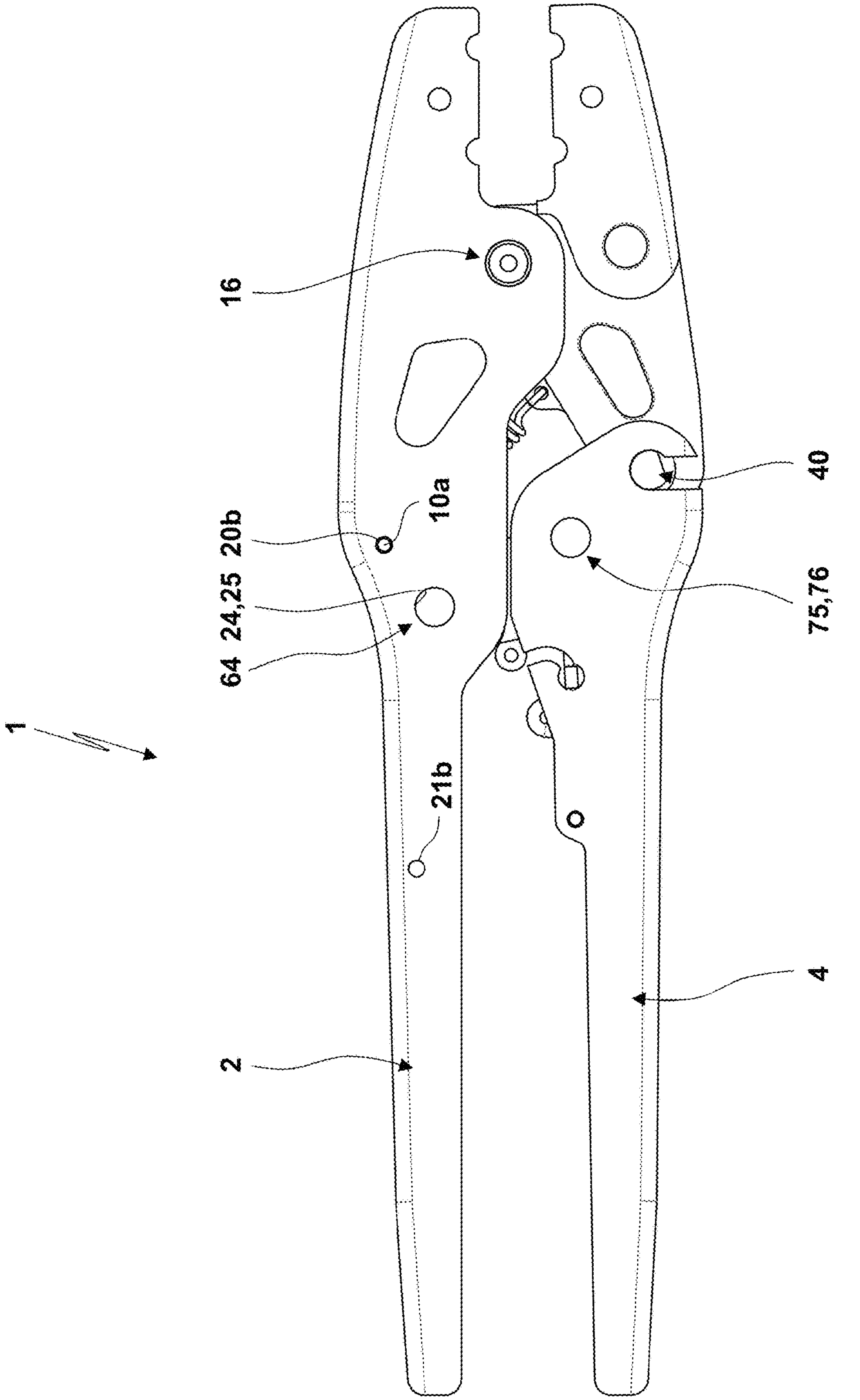
FIG. 15 in a rear view shows the assembled hand pliers tool.

The fixed pliers jaw 11 forms a die accommodation 13 wherein a die half 14 (cp. FIG. 14) can be accommodated and held in an exchangeable way. With respect to the design of the die accommodation 13 and the die half 14, reference is in particular made to the publication DE 198 02 287 C1 which is incorporated by reference into the disclosure of the present patent application. Furthermore, the fixed pliers part 2 comprises a bearing bore 15. In the assembled state of the hand pliers tool, the bearing bolt 6 extends through the bearing bore 15 for the formation of a pivot bearing 16 for a pivoting support of the pliers jaws 5, 11 on each other.

Between the hand lever 12 and the pliers jaw 11, the fixed pliers part 2 comprises a bearing lug 17 having an edge opening 18. An insertion slit 19 opens into the bearing lug 17 and the edge opening 18.

Furthermore, the fixed pliers part 2 comprises bores 20, 21. The bolt 10*a* can be inserted into the bore 20 (e.g. with a press-fit). It is also possible to mount a spring base of the opening spring 7 to the bolt 10*a*.

For the shown embodiment, the fixed pliers part comprises (at least over a major part of its longitudinal extension) an U-shaped cross-section. The two side legs of the U form plates 22, 23 extending parallel to each other and being spaced from each other. The U-shaped design of the fixed pliers part 2 leads to an increase of the stiffness, an increase of the geometrical moment of inertia and an increase of the resisting moment of the fixed pliers part 2. Furthermore, the plates 22, 23 of the fixed pliers part 2 provide two spaced supporting locations for components held on the fixed pliers part:

The die accommodation 13 accommodates a flange of a die half between the two plates 22, 23. Transverse bolts of the die half can then be supported on the shown half-cylindrical contact surfaces of the plates 22, 23 on the fixed pliers jaw 11. The two plates 22, 23 provide two aligned bearing bores 15*a*, 15*b* for accommodating the bearing bolt 6. In a corresponding way the plates 22, 23 also provide aligned bores 20*a*, 20*b*, respectively 21*a*, 21*b*. For the shown embodiment, the bearing lug 17 comprising the edge opening 18 and the insertion slit 19 is only provided at the plate 22. Instead, the plate 23 comprises a bearing lug 24 aligned to the bearing lug 17. The bearing lug 24 does not comprise an edge opening 18. Preferably, the bearing lug 24 in the plate 23 is embodied as a bore 25.

Figure 3:
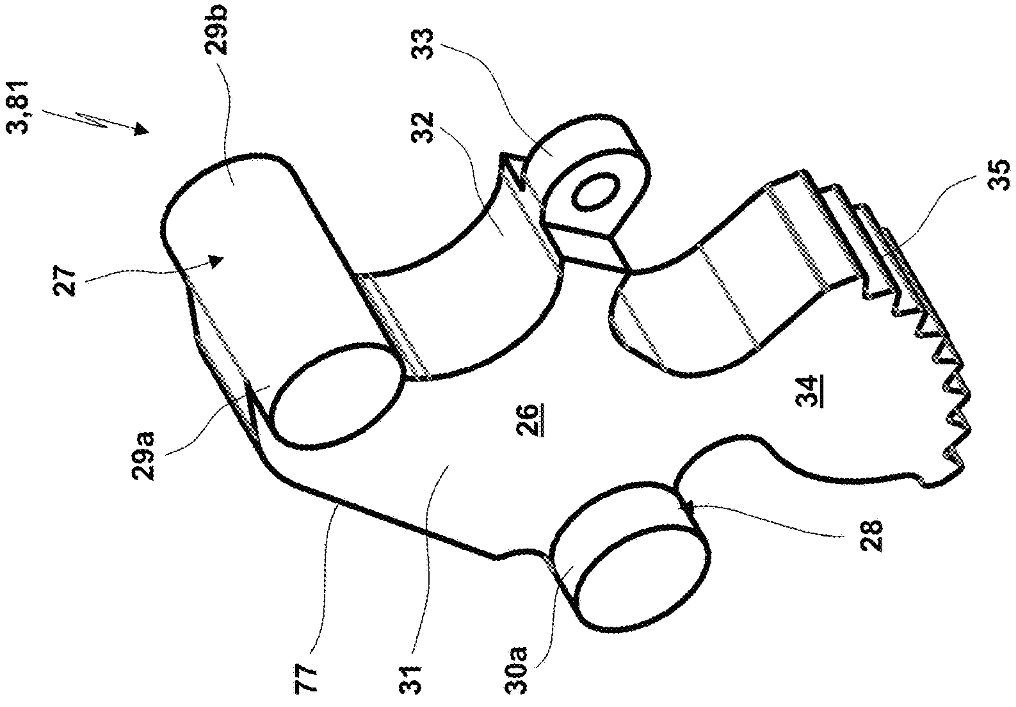

FIG. 3 shows the pressure lever 3 in a three-dimensional single part representation. The pressure lever 3 comprises a base body 26 and two bearing pin bodies 27, 28 integrally connected to the base body 26. The bearing pin body 27 comprises bearing pins 29*a*, 29*b* extending on both sides of the base body 26. In a corresponding way, bearing pins 30*a*, 30*b* of the bearing pin body 28 extend on both sides of the base body 26. The connecting region between the bearing pin bodies 27, 28 provided by the base body 26 forms a toggle lever 31. Furthermore, the base body 26 comprises a protrusion 32 with an accommodation or accommodating eye 33. An outer surface of another protrusion 34 of the base body 26 forms a locking toothing 35 of a forced locking unit.

Figure 4:
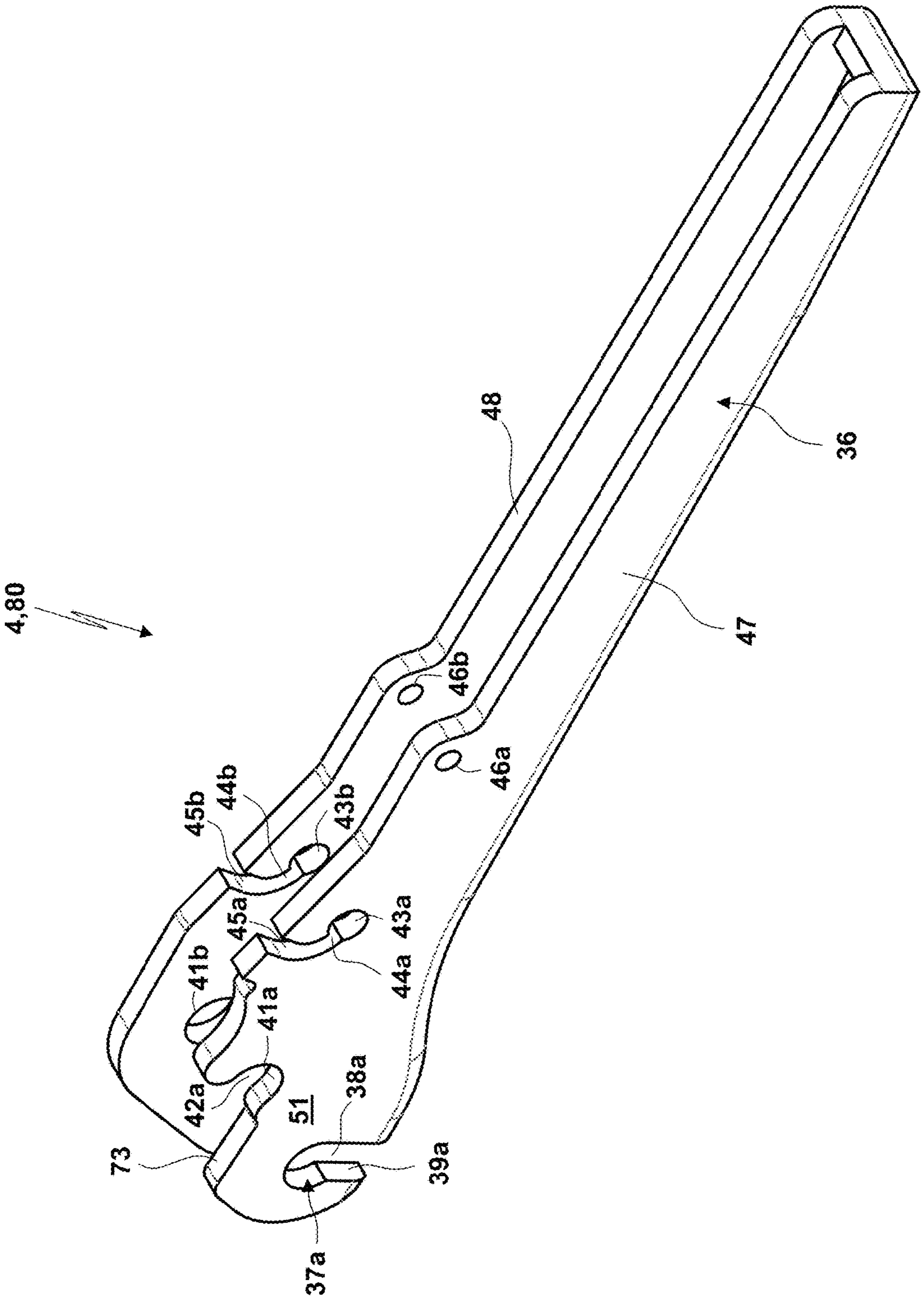

FIG. 4 shows the movable hand lever 4 in a three-dimensional single part representation. The movable hand lever 4 comprises a handle portion 36. On the side which in the assembled state faces away from the fixed pliers part 2, the movable hand lever 4 comprises a bearing lug 37 with an edge opening 38. An insertion slit 39 opens into the bearing lug 37 or the edge opening 38. The bearing lug 37 serves for the provision of a pivot bearing 40 which serves for pivotably linking the movable pliers jaw 5 to the movable hand lever 4. The insertion slit 39 has an orientation in outer direction. The diameter of the bearing lug 37 is larger than the width of the insertion slit 39.

On the inner side, the movable hand lever 4 comprises another bearing lug 41*a* with an edge opening 42*a*. Here, the edge opening 42*a* has an orientation approximately in longitudinal direction of the movable hand lever 4 to the front, so towards the pliers jaws 5, 11. The semi-circular cross-section of the bearing lug 41*a* has (remote from the edge opening 42) an extension in circumferential direction in the region of 150° to 180°, preferably 160° to 180° or 170° to 180°.

The movable hand lever 4 comprises another bearing lug 43 with an edge opening 44. An insertion slit 45 opens into the bearing lug 43 or the edge opening 44. The diameter of the bearing lug 43 is larger than the width of the insertion slit 45 and of the edge opening 44. The insertion slit 45 is curved or inclined and in the beginning has a component in forward direction and then curves or inclines in a way such that the insertion slit 45 in the region of its end-sided opening has an orientation approximately vertical to the longitudinal extension of the movable hand lever 4.

In the transition region to the handle portion 36 the hand lever 4 comprises another bore 46.

Without this necessarily being the case, the movable hand lever 4 also comprises a U-shaped cross-section with plates 47, 48 formed by the side legs of the U. This leads to the consequence that the aforementioned design features are realized in both plates 47, 48.

Accordingly, in both plates 47, 48 bearing lugs 37*a*, 37*b* with edge openings 38*a*, 38*b* and insertion slits 39*a*, 39*b* for the formation of the pivot bearing 40, bearing lugs 41*a*, 41*b* (where for the shown embodiment only one bearing lug 41*a* comprises an edge opening 42*a*, whereas the aligned bearing lug 41*b* has a closed edge), bearing lugs 43*a*, 43*b* with edge openings 44*a*, 44*b* and associated insertion slits 45*a*, 45*b* as well as bores 46*a*, 46*b* are provided. However, within the frame of the invention it is also possible that for the shown pairs of bearing lugs 37, 41, 43 one bearing lug comprises an edge opening and the other aligned bearing lug does not comprise an edge opening or that both bearing lugs of the pair comprise an edge opening.

The material portion of the movable hand lever 4 between the bearing lugs 37, 41 forms a toggle lever 51.

Figure 5:
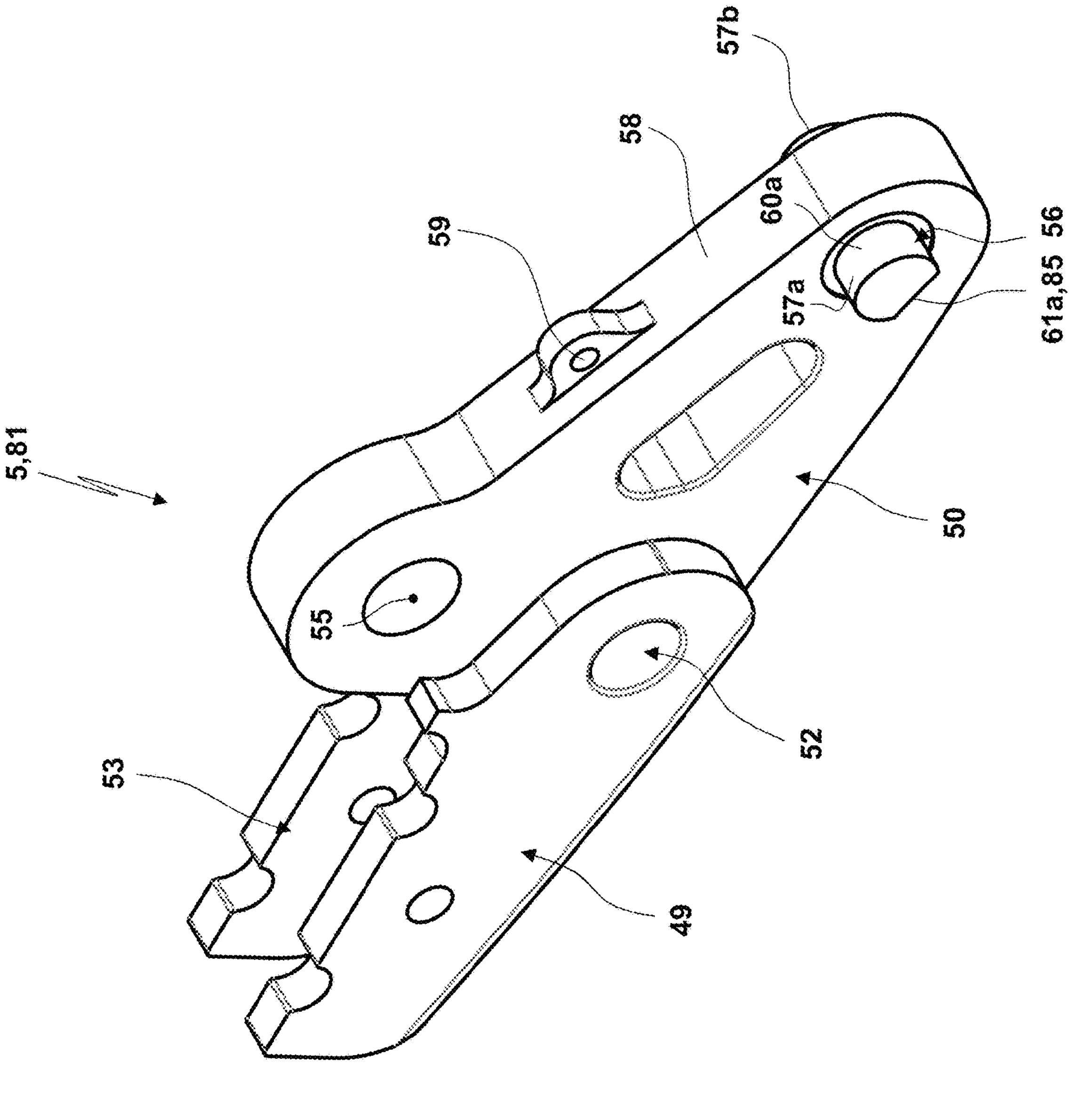

FIG. 5 shows the movable pliers jaw 5 in a three-dimensional single part representation. The movable pliers jaw 5 comprises two pliers jaw parts 49, 50 which are connected to each other by a mounting bolt 52 extending through aligned mounting bores of the pliers jaw parts 49, 50 or connected rigidly to each other in another way. With respect to further information to the design of the movable pliers jaw with two parts and the geometric design reference is made to the European patent application EP 3 553 900 A1. The disclosure of the European patent application EP 3 553 900 A1 is incorporated by reference into the present patent application. However, it is also possible that the pliers jaw 5 is formed integrally as one single piece. In this case, no mounting bolt 52 is used.

In FIG. 5 the movable pliers jaw 5 in a rough approximation has the shape of an inverted T. Here, in the region of a transverse leg of the T a die accommodation 53 for the die half 54 is formed. With respect to the die accommodation 53 for the die half 54 reference is made to the publication DE 198 02 287 C1. The mounting bolt 52 is arranged in the crossing region of the vertical leg of the T and the horizontal leg of the T. In the free end region of the vertical leg of the T the movable pliers jaw 5 comprises a bearing bore 55. In the assembled state, the bearing bolt 6 extends through the bearing bore 55. Accordingly, the bearing bore 55 contributes to the pivot bearing 16 for the pivotable connection of the pliers jaws 5, 11. In the other end region of the horizontal leg of the T the movable pliers jaw 5 comprises a bearing pin body 56. The bearing pin body 56 comprises two bearing pins 57*a*, 57*b*. The bearing pins 57*a*, 57*b* extend on both sides of the base body 58 of the pliers jaw part 50. Furthermore, the movable pliers jaw 5 (here the pliers jaw part 50) comprises an accommodation 59 or accommodating eye. For the shown embodiment, the movable pliers jaw 5 comprises a U-shaped cross-section in the region of the die accommodation 53. A flange of the die half 54 can be inserted into the U-shaped cross-section. The U-shaped cross-section provides a stiff support of the die half 54.

The bearing pin 57 comprises a semi-cylindrical outer surface portion 60 as well as an outer surface portion 61 with a flattening 85.

The two bearing pins 57*a*, 57*b* can be integrally formed as one piece by the pliers jaw 5 or the pliers jaw part 50 or can be formed by a bearing bolt which is fixed in a bore of the pliers jaw 5.

Figure 6:
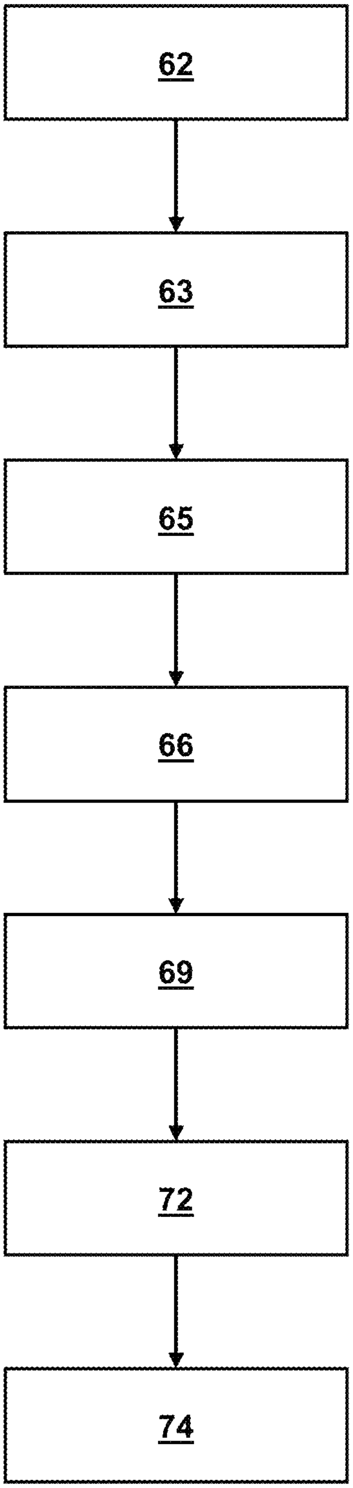
FIG. 6 schematically shows a method for assembling a pliers tool.
Figure 7:
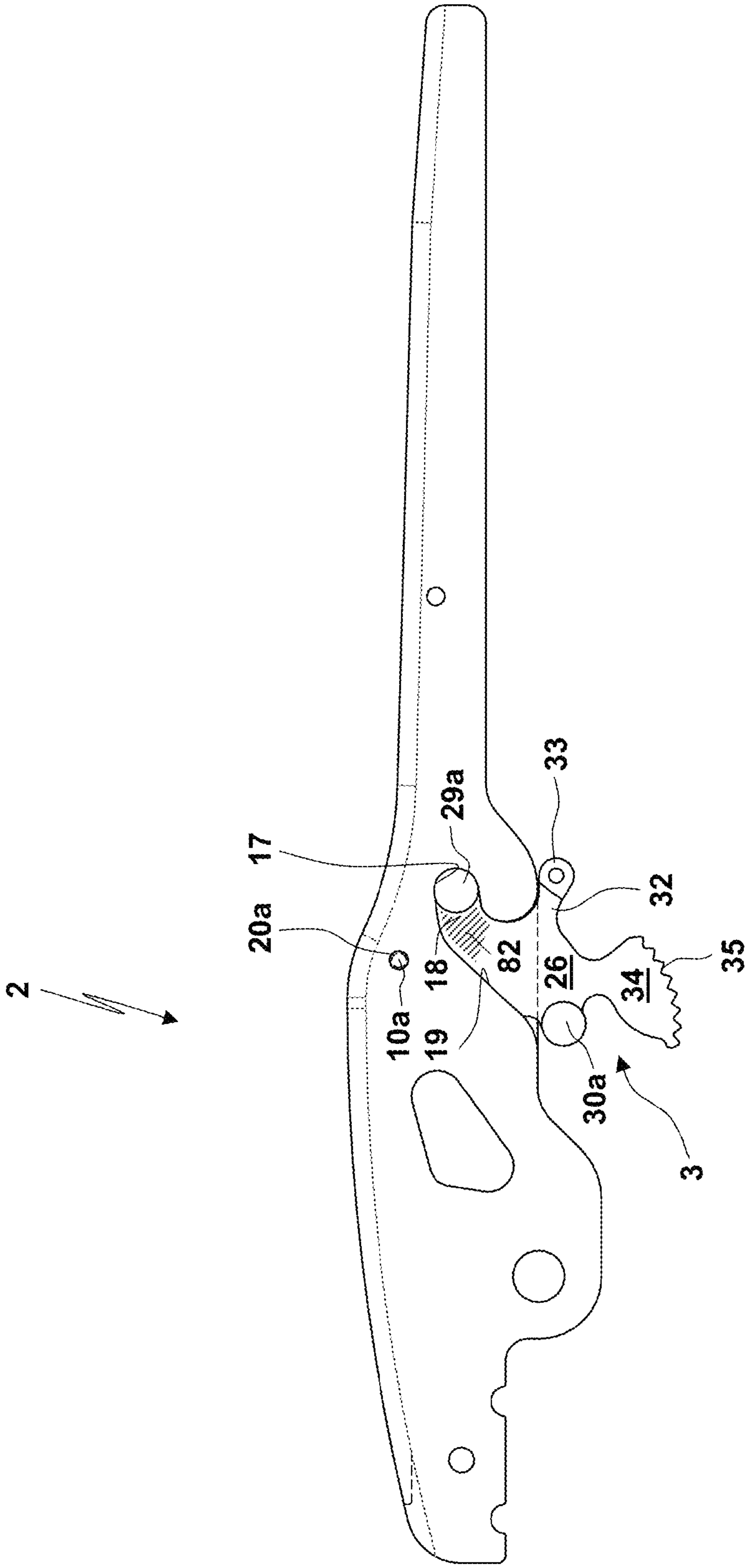
FIGS. 7 to 12 in side views show an assembly of a hand pliers tool with a successive assembly of different components of the same to each other.

FIG. 6 schematically shows a method for assembling a hand pliers tool 1. For the description of the method reference is made to the different assembly steps shown in FIGS. 7 to 12:

In a method step 62 the bolt 10*a* is inserted into the bores 20 of the fixed pliers part 2. In a method step 63 then the pressure lever 3 is (pre-)assembled to the fixed pliers part 2. For that purpose, the bearing pin 29*b* of the pressure lever 3 is inserted in axial direction into the bearing lug 24 of the fixed pliers part 2. Here, the assembly axis corresponds to the longitudinal axis of the bearing pin 29 and the assembly axis runs through the bearing lugs 17, 24. Here, a planar or straight back 77 of the pressure lever 3 slides along a guiding surface formed by the insertion slit 19. A section 82 of the base body 26 of the pressure lever 3 comprises (in a side view) a smaller dimension than the insertion slit 19 and the edge opening 18. Accordingly, this section 82 is able to enter into the insertion slit 19 and the edge opening from the side and pass through the same until the section contacts the plate 23 of the fixed pliers part 2. This assembly state is shown in FIG. 7. In this way, a pivot bearing 64 is established by which the pressure lever 26 is supported for being pivoted on the fixed pliers part 2. In order to allow the pivoting in the region of the section 82, the thickness of the base body 26 is smaller than the distance of the plates 22, 23. Accordingly, it is possible that with the pivoting movement the section 82 moves between the plates 22, 23.

Figure 8:
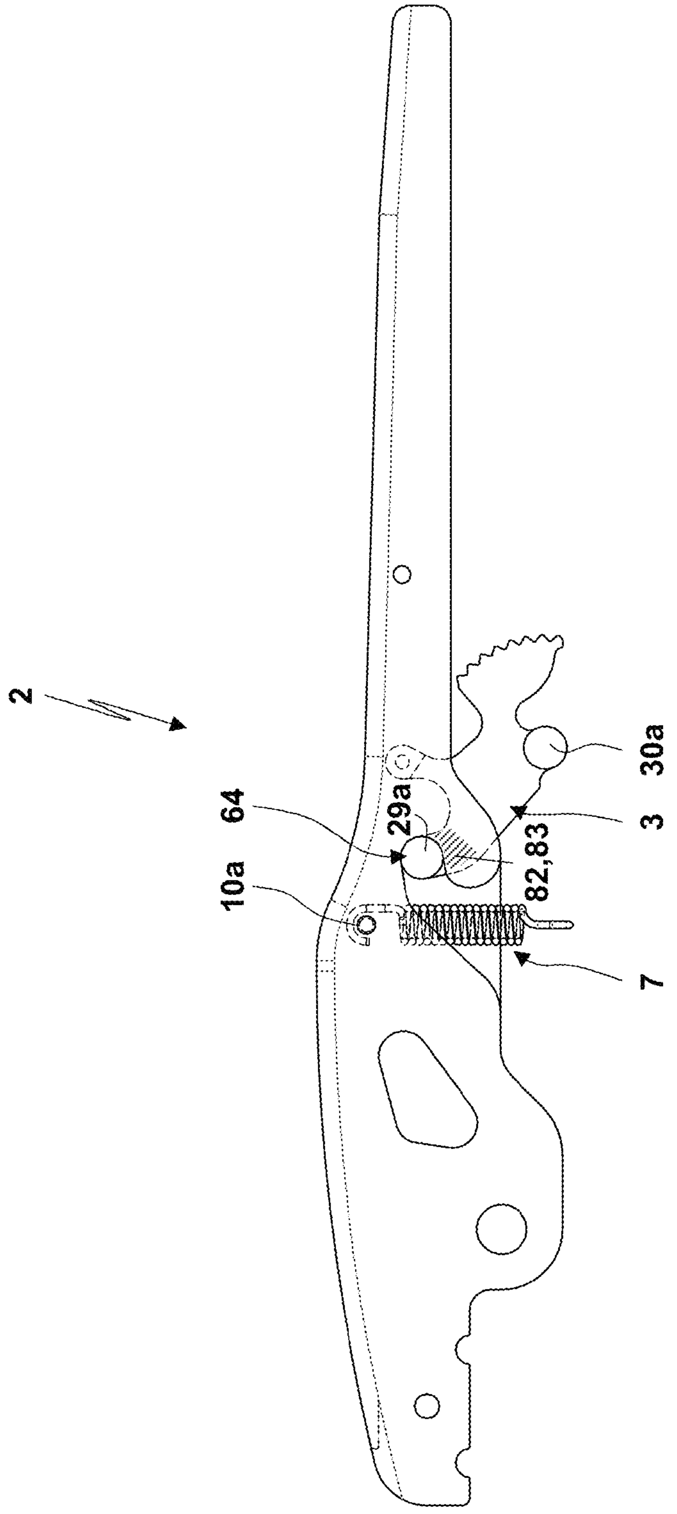
Figure 9:
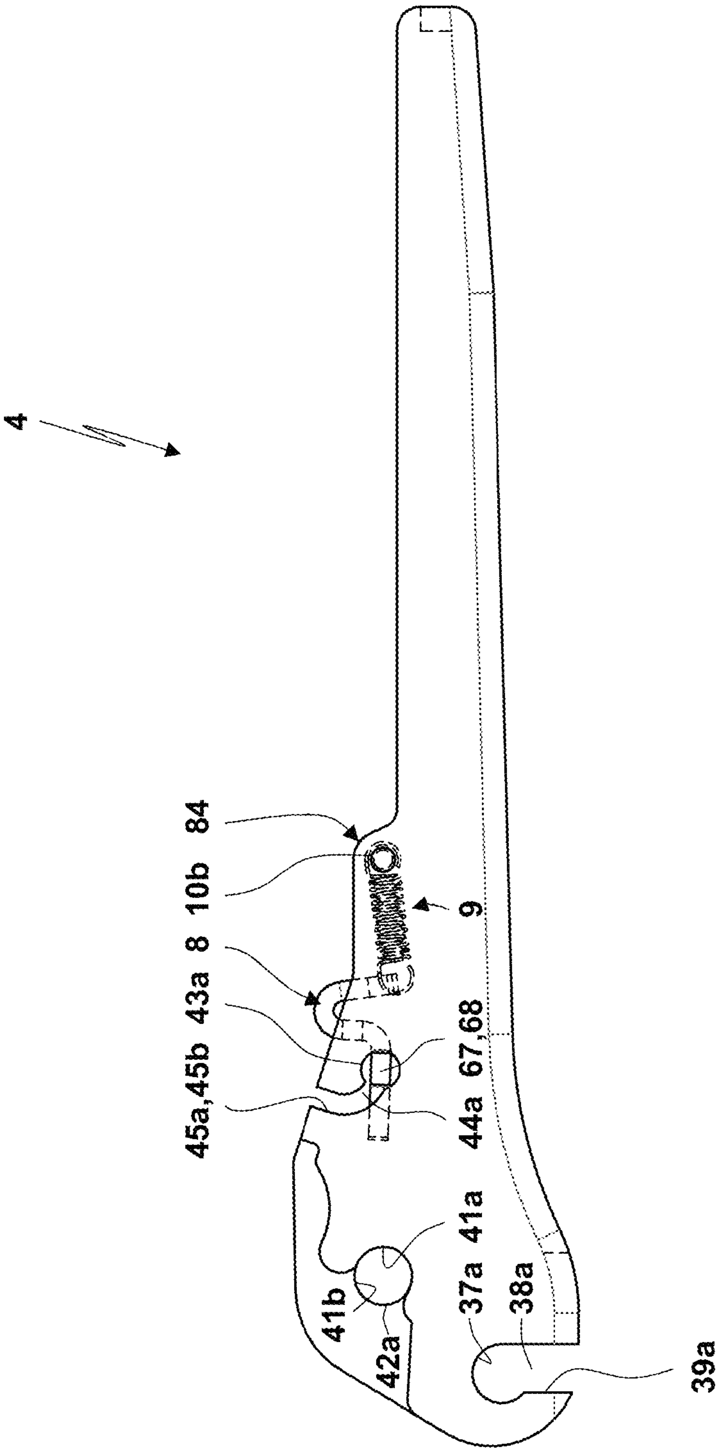

In a method step 65 (by use of the pivoting degree of freedom of the pivot bearing 84) the pressure lever 3 is pivoted backwards on the fixed pliers part 2 so that the section 82 is moved between the plates 22, 23 and an overlap 83 between the section 82 and the plates 22, 23 establishes. Due to the overlap 83 a disassembly along the (dis)assembly axis is blocked. Instead, an assembly and a disassembly of the pressure lever 3 to and from the fixed pliers part 2 is only possible in the assembling angular position of FIG. 7. However, this assembling angular position is not reached during the whole working stroke of the hand pliers tool 1. Then the opening spring 7 is mounted to the bolt 10*a* which is fixedly held on the fixed pliers part 2. This partially assembled state is shown in FIG. 8.

In a method step 66 the locking pawl 8 and the locking spring 9 are mounted to the movable hand lever 4. The locking pawl 8 comprises a bearing pin 67. For the shown embodiment, the locking pawl 8 is manufactured from a bent sheet metal part. The bearing pin 67 is here formed by a locking pawl protrusion 68. The bearing pin 67 of the locking pawl 8 is introduced through the insertion slit 45 and the edge opening 44 into the bearing lug 43 of the movable hand lever 4. The locking spring 9 is mounted to the locking pawl 8. The other spring base of the locking spring 9 is mounted to the pin 10*b* which is fixedly connected to the bores 46 of the movable hand lever 4. The locking spring 9 pulls the bearing pin 67 in a direction opposite to the edge opening 44 into the bearing lug 43 so that in the partially assembled state shown in FIG. 9 the locking pawl and the locking spring 9 are held in a loss-proof way on the movable hand lever 4.

In a method step 69 the movable pliers jaw 5 is mounted to the movable hand lever 4. For that purpose, the movable pliers jaw 5 is moved into an assembling angular position relative to the hand lever 4. The assembling angular position will not be achieved over the whole working stroke when the hand pliers tool has completely been assembled. Here, according to FIG. 10 the horizontal leg of the T of the movable pliers jaw 5 has an orientation approximately vertical to the longitudinal extension of the hand lever 4.

Accordingly the flattening 85 of the outer surface portion 61 has an orientation parallel to the insertion slit 39. Accordingly, a reduced extension 70 of the bearing pin 57 due to the flattening 85 of the outer surface portion 61 can be used for inserting the bearing pin 57 through the narrowed insertion slit 39 and the edge opening 38 into the bearing lug 37 of the movable hand lever 4. The bearing pin 57 of the movable pliers jaw 5 and the bearing lug 37 of the movable hand lever 4 form the pivot bearing 40 for the pivotable support of the movable pliers jaw 5 on the movable hand lever 4. If the movable pliers jaw 5 is pivoted from the position relative to the movable hand lever 4 shown in FIG. 10 towards the stretched position, the flattened outer surface portion 61 is pivoted relative to the edge opening 38 so that an increased extension 71 of the bearing pin 57 in the semi-cylindrical outer surface portion 60 of the bearing pin 57 comes into effect. The increased extension 71 makes an exit of the bearing pin 57 from the bearing lug 37 impossible.

Figure 10:
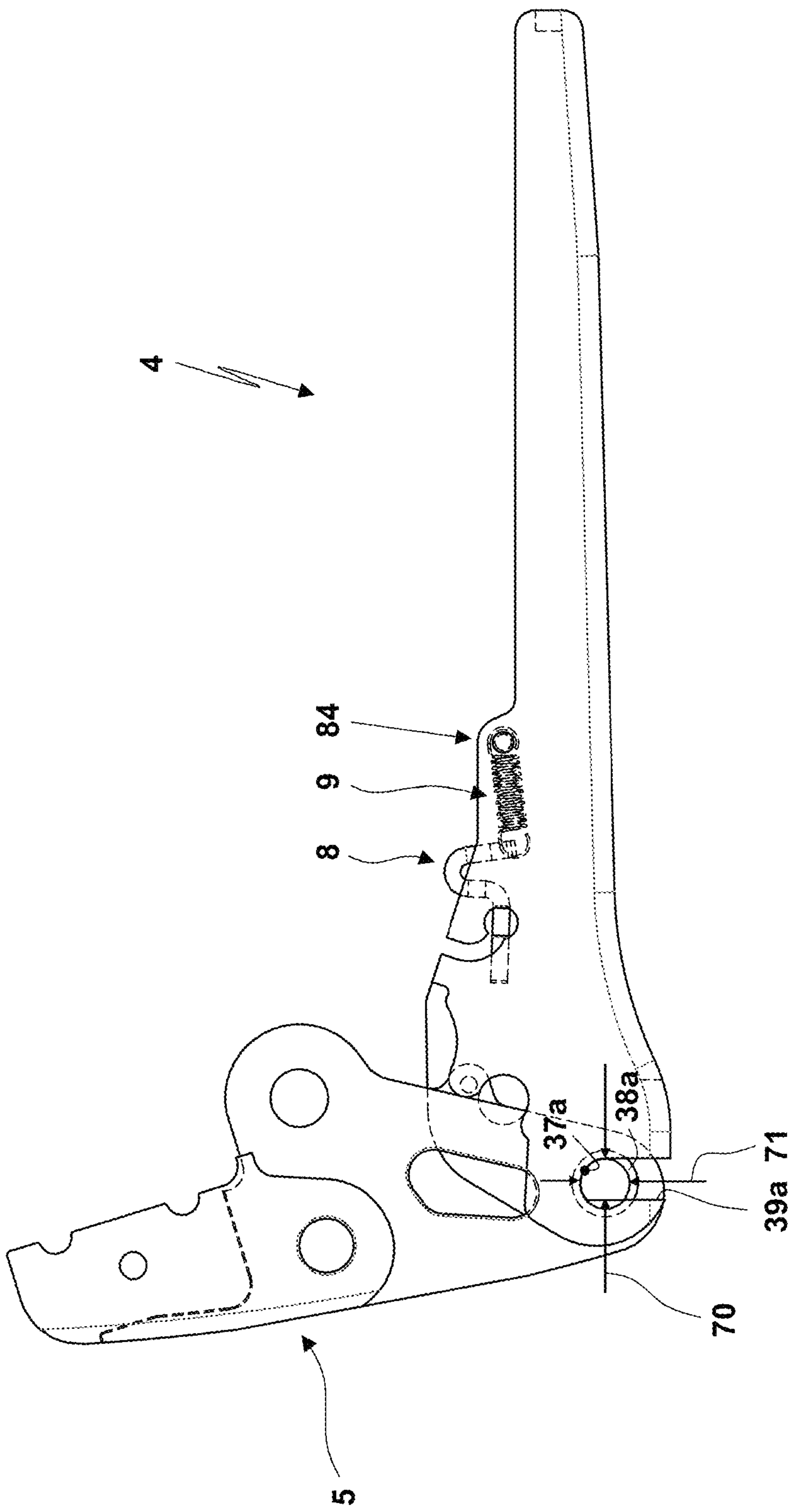

In a method step 72 the pre-assembled subunits (namely on the one hand the fixed pliers part 2, the pressure lever and the opening spring in the assembled state according to FIG. 8 and on the other hand the movable hand lever 4 with the locking pawl 8 in the locking spring 9 as well as the movable pliers jaw 5 in the assembled state shown in FIG. 10) are assembled to each other. For that purpose, first the free spring base of the opening spring 7 is mounted to the accommodation 59 of the movable pliers jaw 5. Furthermore, the movable hand lever 4 with the movable pliers jaw 5 held thereon for being pivoted is moved closer to the pressure lever 3 which is pivotably held on the fixed pliers part 2. Accordingly, the bearing pins 30*a*, 30*b* of the pressure lever 3 are able to enter into the bearing lugs 41*a*, 41*b* of the movable hand lever. The bearing lugs 30 enter in axial direction into the bearing lugs 41 with an assembly along an assembly axis which corresponds to the longitudinal axis of the bearing pins 30 and runs through the bearing lugs 41. The section of the base body 26 in the neighborhood of the bearing pin 30 has a geometry being smaller than the geometry of the edge opening 42. Accordingly, this section of the base body 26 is able to enter in lateral direction into the plate or wall opening 42. It is possible that during this movement there is a sliding guidance between the movable hand lever 4 and the pressure lever 3 by a sliding movement of the back 77 of the pressure lever 3 along a guiding surface 73 of the movable hand lever 4. The partially assembled state then reached is shown in FIG. 11.

Figure 12:
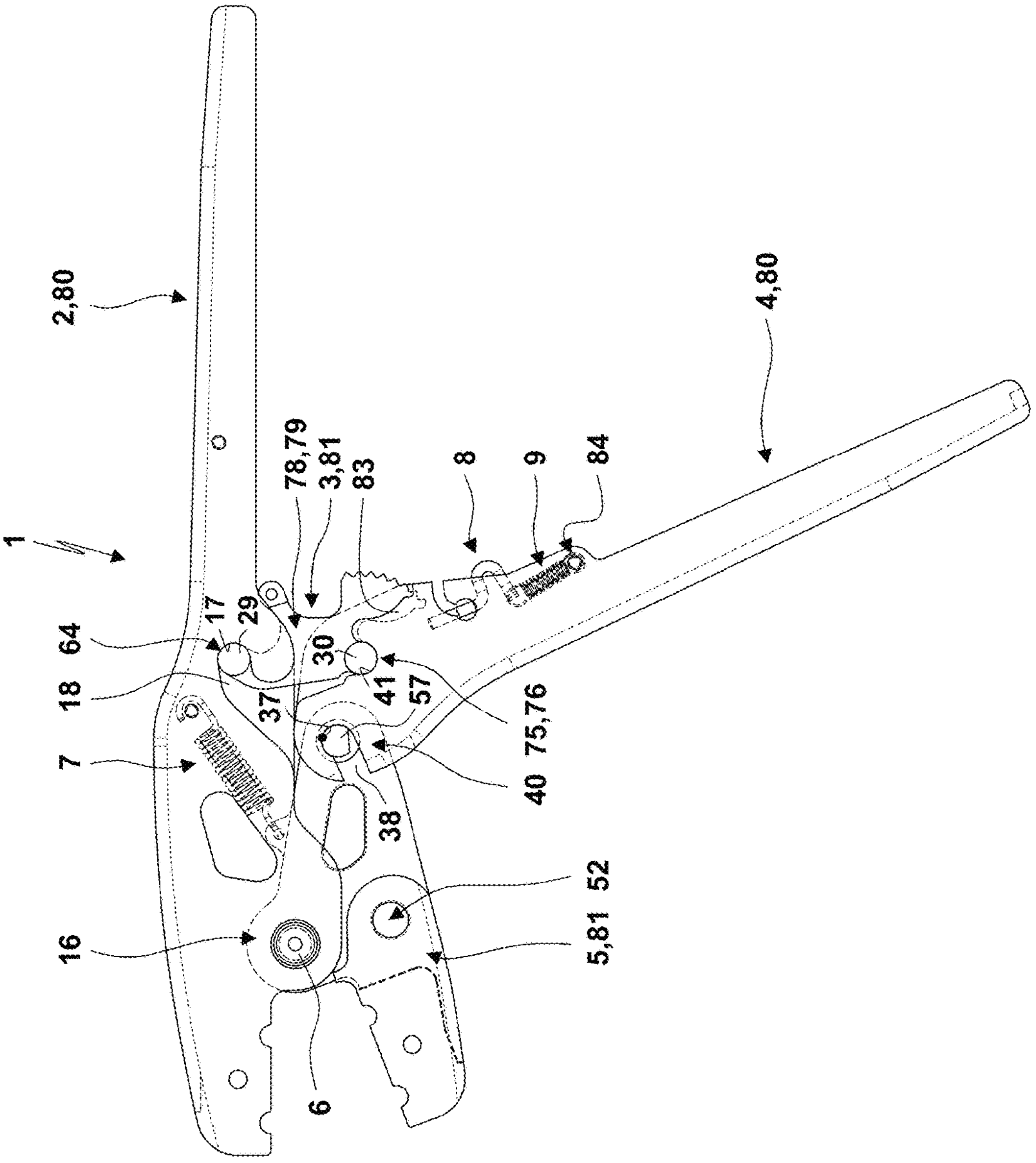
Figure 13:
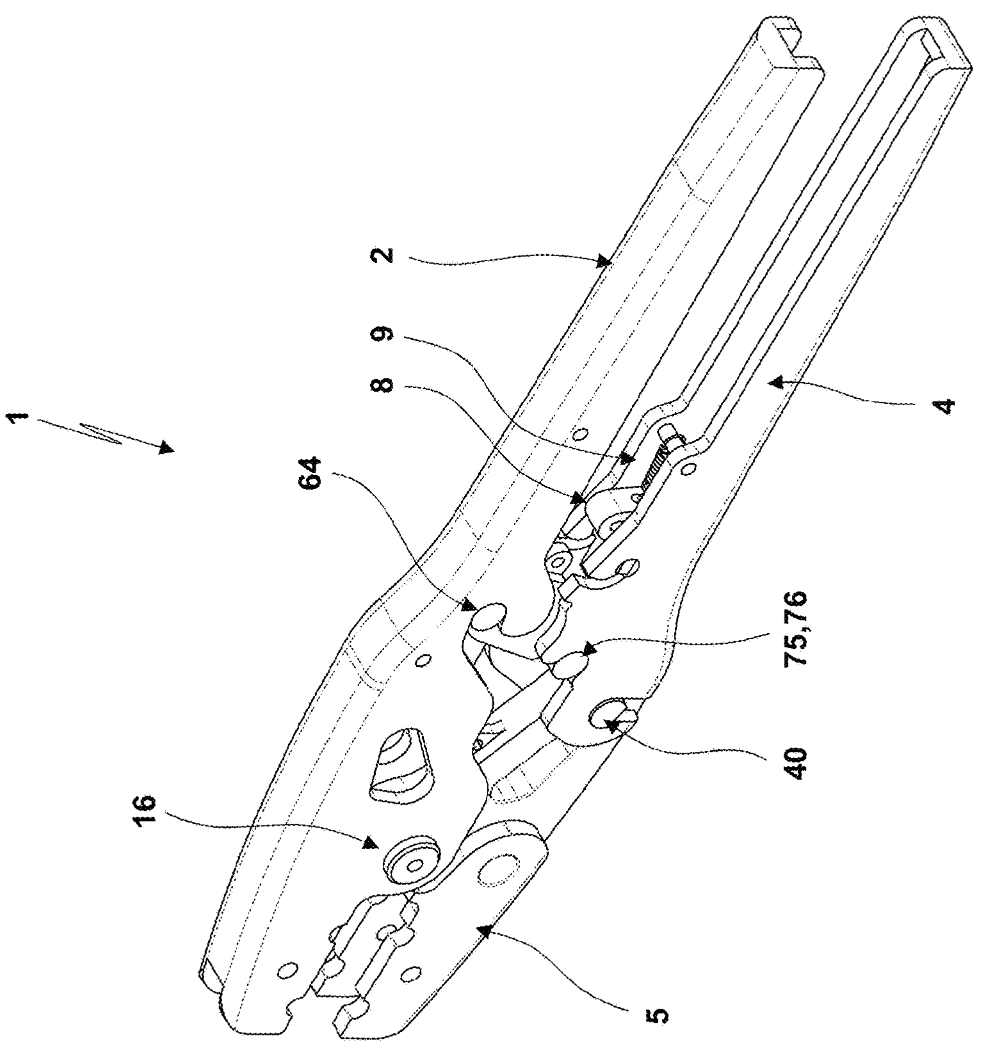
FIG. 13 in a three-dimensional view shows the assembled hand pliers tool.

Then, in a method step 74 the bearing bores 15 of the fixed pliers part 2 and the bearing bore 55 of the movable pliers jaw 5 are moved into an aligned position so that it is possible to insert the bearing bolt 6 into the bearing bores 15, 55 and to secure the bearing bolt 6 by suitable securing elements or by a press-fit against an undesired exit. In this position, the opening spring 7 is tensioned. The induced aligned position of the bearing bores 15, 55 has the result that a pivoting movement of the pressure lever 3 relative to the movable hand lever 4 is possible. Due to this pivoting movement, the section of the base body 26 (which in the assembling angular position passed the bearing lug 41*a* and the outer contour of the movable hand lever 4) enters between the plates 47, 48 of the movable hand lever 4 so that an overlapping 83 establishes which makes a disassembly for an orientation other than the assembling angular position impossible. Also this assembling angular position will not be reached when running through the working stroke. The state of the hand pliers tool (generally ready for being operated; completely assembled with respect to the base function) is shown in FIG. 12.

Figure 11:
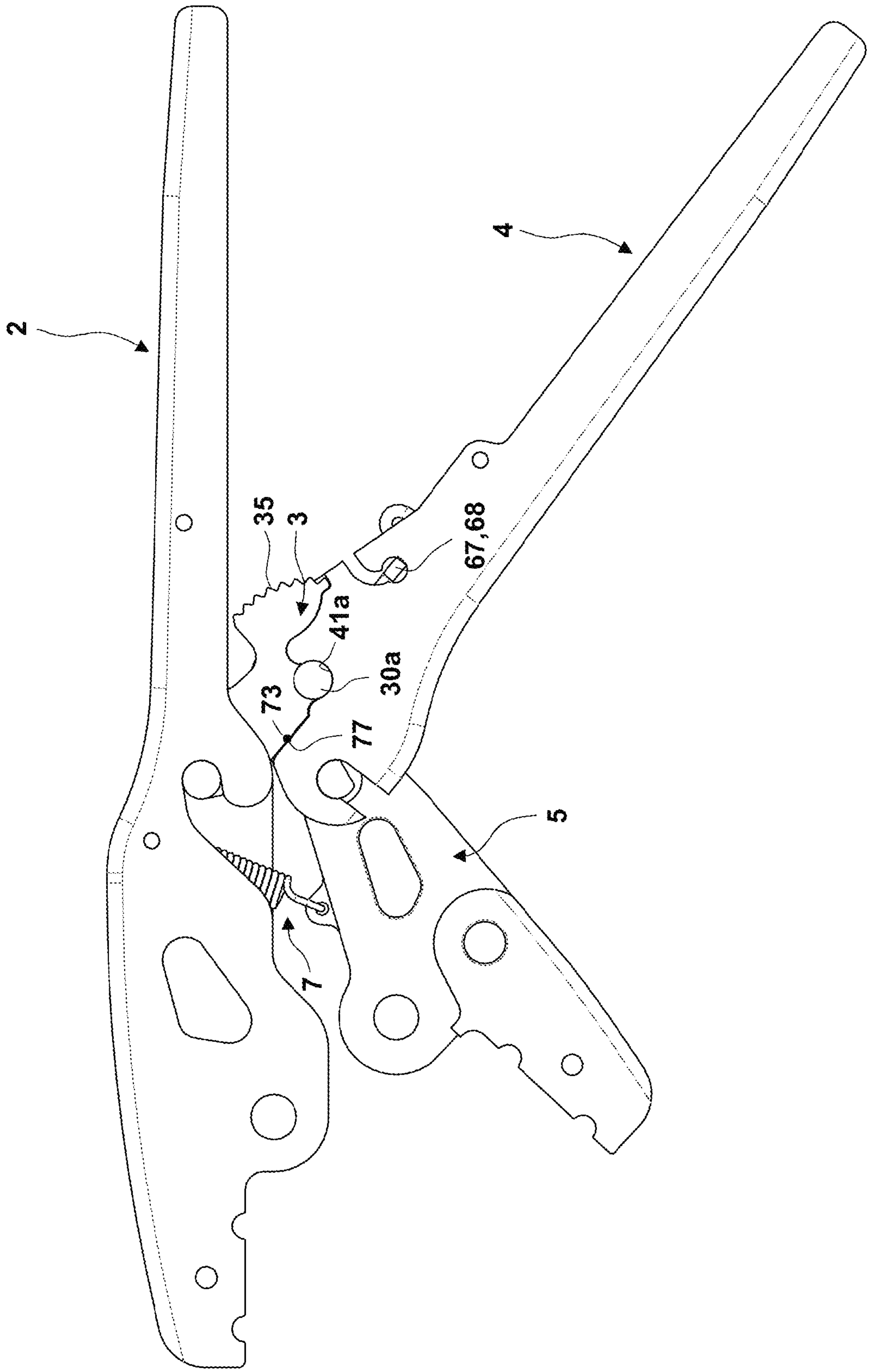

The accommodation of the bearing pin 30 of the pressure lever 3 in the bearing lug 41 of the movable hand lever 4 provides a pivot bearing 75. The pivot bearing 75 provides a toggle joint 76 for the toggle lever 31 formed by the pressure lever 3 and the toggle lever 51 formed by the movable hand lever 4. Here, the toggle lever 51 is linked in the pivot joint 40 to the movable hand lever 4 and the movable pliers jaw 5. The toggle lever 31 is linked by the pivot bearing 64 to the fixed pliers part 2. When the pivot bearing 16 between the pliers jaws 5, 11 has been assembled, the different bearing pins are not able to exit from the bearing lugs having (partially) open edges:

Due to a stop it is not possible to pivot the movable hand lever 4 starting from FIG. 11 further away from the fixed pliers part 2. Accordingly, it is not possible that the flattening of the pin 57 is rotated to an extent that the assembling angular position of the pin 57 and the bearing lug is again reached and the pin 57 is able to exit through the edge opening 38 from the bearing lug 37.

Also an exit of the bearing pin 30 of the pressure lever 3 from the associated bearing lug 41 of the movable hand lever 4 would require a further opening movement of the movable hand lever 4 back to the assembling angular position of the bearing pin 30 and the associated bearing lug 41. However, such a further opening movement is not possible.

Finally, the exit of the bearing pin 29 from the edge opening 18 of the bearing lug 17 would require that the pressure lever 3 is moved to the front which also is not possible.

Due to the fact that in the pivot bearing 75 one bearing lug 41*a* has an open edge, whereas the other bearing lug 41*b* has a closed edge and due to the fact that in the pivot bearing 64 one bearing lug 17 has an open edge and the other bearing lug 24 has a closed edge any displacements of the pressure lever 3 when opening the hand lever 4 (in some cases due to the effect of the opening spring) and/or any operational error can be avoided.

The fixed pliers part 2 as well as the movable hand lever 4 comprise a U-shaped cross-section as explained before. This design leads to an increase of the stability against bending and torsion. It would generally also be possible that components of the hand pliers tool 1 are produced in a plate design with parallel plates riveted to each other. However, in some cases by use of riveted parallel plates it will not be possible to achieve the same stability for comparable profile dimensions and material thicknesses.

The U-shaped fixed pliers part 2 and/or the U-shaped movable hand lever 4 can be manufactured by deep drawing or punch drawing of a metal sheet or as a MIM-injection molding part (in particular of steel). Also the other components as the pressure lever 3 or the pliers jaw parts 49, 50 or an integral, one-piece movable pliers jaw 5 might also be manufactured by a MIM-process or precision casting.

It is also possible that the aforementioned components (all of them or only a part of them) is manufactured from a high rigidity plastic material. Preferably a plastic material can be used having a stiffness being higher than 230 $N/mm^2$, higher than 250 $N/mm^2$ or even higher than 280 $N/mm^2$.

It is possible that (alternatively or cumulatively to the opening spring 7) another spring is used which is mounted with one spring base to the accommodation 33 of the pressure lever 3, whereas the other spring base is linked to a bolt which extends through a bore 21 of the fixed pliers part 2.

A drive mechanism 78 is interposed between the hand levers 4, 12 and the pliers jaw 5, 11. Here, the drive mechanism 78 is embodied as a toggle lever drive 79. Drive elements of the drive mechanism 78 are in particular the toggle levers 31, 51 which are formed by the movable hand lever 4 and the pressure lever 3.

In the pivot bearing 64 by which the pressure lever 3 is supported for being pivoted on the fixed pliers part 2 the fixed pliers part 2 forms the first pliers pivoting part 80 which forms the bearing lug 17, 24, whereas the pressure lever 3 forms a second pivoting pliers part 81 which provides the bearing pin 29 associated with the bearing lug 17.

In the pivot bearing 75 by which the pressure lever 3 is supported for being pivoted on the movable hand lever 4 the movable hand lever 4 forms the first pliers pivoting part 80 which provides the bearing lug 51, whereas the pressure lever 3 forms the second pliers pivoting part 81 which provides the bearing pin 30.

In the pivot bearing 40 by which the movable pliers jaw 5 is supported for being pivoted on the movable hand lever 4 the movable hand lever 4 forms the first pliers pivoting part 80 which provides the bearing lug 37, whereas the movable pliers jaw 5 forms the second pliers pivoting part 81 which provides the bearing pin 57 for the bearing lug 37.

Many variations and modifications may be made to the preferred embodiments of the invention without departing substantially from the spirit and principles of the invention. All such modifications and variations are intended to be included herein within the scope of the present invention, as defined by the following claims.

We claim:

1. A hand pliers tool comprising a) hand levers, b) pliers jaws and c) a drive mechanism, which ca) comprises drive elements and cb) connects the hand levers to the pliers jaws in a way such that by a relative movement of the hand levers it is possible to induce a relative movement of the pliers jaws over a working stroke, d) a first pliers pivoting part and a second pliers pivoting part which are connected to each other for being pivoted by a pivot bearing and which are pivoted in the working stroke relative to each other, wherein e) the first pliers pivoting part comprises a bearing lug having an edge opening and f) a bearing pin of the second pliers pivoting part is inserted through the edge opening into the bearing lug of the first pliers pivoting part and is supported for being pivoted in the bearing lug, in this way the pivot bearing being formed, g) the bearing pin of a second pliers pivoting part comprises an outer surface ga) comprising an outer surface portion having a transverse extension being larger than a transverse extension of the edge opening of the first pliers pivoting part and gb) comprising an outer surface portion having a transverse extension being smaller than a transverse extension of the edge opening of the first pliers pivoting part, h) so that the bearing pin of the second pliers pivoting part can exclusively be inserted in one angular position or an angular region of the pliers pivoting parts into the edge opening of the bearing lug of the first pliers pivoting part and the one angular position or the angular region of the pliers pivoting parts cannot be reached when the hand pliers tool has been completely assembled, i) the hand levers comprising a movable hand lever being the first pliers pivoting part, j) the pliers jaws comprising a movable pliers jaw being the second pliers pivoting part, k) the pivot bearing linking the movable hand lever to the movable pliers jaw and the pivot bearing comprising the bearing pin extending in the bearing lug having the open edge, l) A second pivot bearing links a pressure lever to a fixed pliers part, the second pivot bearing comprising a second bearing pin extending in a second bearing lug having a second open edge, m) a third pivot bearing linking the pressure lever to the movable hand lever, the third pivot bearing comprising a third bearing pin extending in a third bearing lug having a third open edge, and n) a fourth pivot bearing linking the movable pliers jaw to the fixed pliers part, the fourth pivot bearing comprising a bearing bolt extending in bearing bores with closed edges of the movable pliers jaw and of the fixed pliers part.

2. The hand pliers tool of claim 1, wherein a) the second pliers pivoting part comprises a base body and the bearing pin and b) the bearing pin is connected as one integral piece to the base body.

3. The hand pliers tool of claim 1, wherein the first and second pliers pivoting parts connected to each other by the bearing pin and the bearing lug having an edge opening are a) a hand lever and a pliers jaw or b) a hand lever and a pressure lever or c) a hand lever and a locking pawl of a forced locking unit.

4. The hand pliers tool of claim 1, wherein at least one of the first and second pliers pivoting parts is made of plastic.

5. The hand pliers tool of claim 1, wherein at least one of the first and second pliers pivoting parts is manufactured in an MIM-process.

6. The hand pliers tool of claim 1, wherein the hand pliers tool is embodied as a) crimping pliers or b) cutting pliers or c) tube pressing pliers.

7. The hand pliers tool of claim 1, wherein a) in the hand pliers tool two pliers pivoting parts are connected to each other for being pivoted by a pivot bearing, a bearing bolt being arranged in bearing lugs of the first and second pliers pivoting parts, the bearing lugs having closed edges, and b) all of the other pliers pivoting parts are exclusively connected to each other for being pivoted by pivot bearings wherein at least one bearing pin is arranged in a bearing lug having an edge opening.

8. The hand pliers tool of claim 7, wherein a mechanical pliers subassembly comprising all of the components being required for the transmission of the hand force applied by the user on the hand levers to the pliers jaws only comprises a) the bearing bolt, b) four or less further components.

9. A method for assembling a hand pliers tool, the method comprising the following method steps:

a) providing a hand pliers tool comprising aa) hand levers, ab) pliers jaws and ac) a drive mechanism, which aca) comprises drive elements and acb) connects the hand levers to the pliers jaws in a way such that by a relative movement of the hand levers it is possible to induce a relative movement of the pliers jaws over a working stroke, ad) a first pliers pivoting part and a second pliers pivoting part which are connected to each other for being pivoted by a first pivot bearing and which are pivoted in the working stroke relative to each other, wherein ae) the first pliers pivoting part comprises a first bearing lug having a first edge opening and af) a first bearing pin of the second pliers pivoting part is inserted through the first edge opening into the first bearing lug of the first pliers pivoting part and is supported for being pivoted in the first bearing lug, in this way the first pivot bearing being formed, ag) the first bearing pin of the second pliers pivoting part comprises an outer surface aga) comprising an outer surface portion having a transverse extension being larger than a transverse extension of the first edge opening of the first pliers pivoting part and agb) comprising an outer surface portion having a transverse extension being smaller than a transverse extension of the first edge opening of the first pliers pivoting part, ah) so that the first bearing pin of the second pliers pivoting part can exclusively be inserted in one angular position or an angular region of the pliers pivoting parts into the first edge opening of the first bearing lug of the first pliers pivoting part and the one angular position or the angular region of the pliers pivoting parts cannot be reached when the hand pliers tool has been completely assembled, ai) the first pliers pivoting part being embodied as a movable hand lever and the second pliers pivoting part being embodied as the movable pliers jaw, b) assembly of a second pivot bearing between a pressure lever and a fixed pliers part which forms a fixed pliers jaw and a fixed hand lever by inserting a second bearing pin into a second bearing lug having a second open edge, c) assembly of the first pivot bearing between the movable hand lever and the movable pliers jaw by inserting the first bearing pin into a first bearing lug having the first open edge, d) assembly of a third pivot bearing formed between the pressure lever and the movable hand lever by inserting a third bearing pin into a third bearing lug having a third open edge, and e) assembly of a fourth pivot bearing formed between the movable pliers jaw and the fixed pliers part by inserting a bearing bolt into bearing bores with closed edges of the movable pliers jaw and of the fixed pliers part and securing the bearing bolt against exiting from the bearing bores.

* * * * *